United States Patent
Yoo et al.

(10) Patent No.: US 10,892,864 B2
(45) Date of Patent: Jan. 12, 2021

(54) UNIFIED REFERENCE SIGNAL DESIGN FOR ENHANCED COMPONENT CARRIERS

(71) Applicant: QUALCOMM Incorporated, San Diego, CA (US)

(72) Inventors: Taesang Yoo, Riverside, CA (US); Zhifei Fan, San Diego, CA (US); Weiliang Zeng, San Diego, CA (US); Jing Sun, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 15/460,079

(22) Filed: Mar. 15, 2017

(65) Prior Publication Data

US 2017/0295000 A1    Oct. 12, 2017

Related U.S. Application Data

(60) Provisional application No. 62/319,166, filed on Apr. 6, 2016.

(51) Int. Cl.
*H04L 5/00* (2006.01)
*H04L 27/26* (2006.01)
(Continued)

(52) U.S. Cl.
CPC ......... *H04L 5/0048* (2013.01); *H04B 17/336* (2015.01); *H04J 13/004* (2013.01);
(Continued)

(58) Field of Classification Search
CPC . H04L 5/0007; H04L 5/0048; H04L 27/2636; H04B 17/336
See application file for complete search history.

(56) References Cited

U.S. PATENT DOCUMENTS

2012/0106595 A1    5/2012  Bhattad et al.
2012/0275414 A1*  11/2012  Hu ..................... H04B 7/0452
                                                    370/329
(Continued)

FOREIGN PATENT DOCUMENTS

| EP | 1317086 A1 | 6/2003 |
|---|---|---|
| WO | WO-2012071721 A1 | 6/2012 |
| WO | WO-2016099978 A2 | 6/2016 |

OTHER PUBLICATIONS

ISA/EP, International Search Report and Written Opinion of the International Searching Authority, Int'l Application No. PCT/US2017/022745, dated May 17, 2017, European Patent Office, Rijswijk, NL, 16 pgs.

*Primary Examiner* — Kodzovi Acolatse
*Assistant Examiner* — Farhad Ali
(74) *Attorney, Agent, or Firm* — Holland & Hart LLP/Qualcomm

(57) ABSTRACT

Methods, systems, and devices for wireless communication are described. A base station may multiplex reference signal (RS) transmissions for different antenna ports over a set of resource elements using a code division multiplexing (CDM) group spreading in a time dimension and a frequency dimension. The base station may transmit the RS transmissions over the set of resource elements based at least in part on the multiplexing to a user equipment (UE). The UE may demultiplex the RS transmissions based at least in part on a CDM group and may select at least one of the time dimension or the frequency dimension over which to demultiplex the RS transmissions based on a determination or other information.

26 Claims, 14 Drawing Sheets

(51) Int. Cl.
*H04L 5/02* (2006.01)
*H04J 13/00* (2011.01)
*H04B 17/336* (2015.01)

(52) U.S. Cl.
CPC ............ *H04L 5/005* (2013.01); *H04L 5/0026* (2013.01); *H04L 5/026* (2013.01); *H04L 27/2613* (2013.01); *H04L 27/2636* (2013.01); *H04L 5/0007* (2013.01)

(56) References Cited

U.S. PATENT DOCUMENTS

2013/0107694 A1* 5/2013 Hu ...................... H04J 13/0003
370/203
2013/0294333 A1 11/2013 Chen et al.
2014/0204913 A1* 7/2014 Hu ....................... H04L 5/0017
370/335

* cited by examiner

UNIFIED REFERENCE SIGNAL DESIGN FOR ENHANCED COMPONENT CARRIERS

CROSS REFERENCES

The present Application for Patent claims priority to U.S. Provisional Patent Application No. 62/319,166 by Yoo, et al., entitled "Unified Reference Signal Design For enhanced Component Carriers," filed Apr. 6, 2016, assigned to the assignee hereof, and which is hereby expressly incorporated by reference herein in its entirety.

BACKGROUND

The following relates generally to wireless communication, and more specifically to unified reference signal (RS) design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

In some cases, a transmitting device uses multiple antenna ports to wirelessly communicate with a receiving device. In this scenario, reference signal measurements made by the recipient device for different antenna ports can provide useful feedback to the transmitting device. While many wireless devices have systems in place for mapping reference signal transmissions for different antenna ports to time and frequency resources, some devices use different mapping systems for different types of reference signals. The use of different mapping systems can result in inefficient resource usage and unnecessary redundancy at the transmitting and receiving devices.

SUMMARY

The described techniques relate to improved methods, systems, devices, or apparatuses that support a unified design for multiplexing RS transmissions across multiple antenna ports. Generally, the described techniques provide for unified RS processing and methods, which may be used for types of wireless transmissions, such as for example using enhanced component carriers (eCCs), Licensed Assisted Access (LAA) component carriers (CCs), New Radio (NR) systems (e.g., 5G), MuLTEFire networks, etc.

For example, a first device may multiplex RS transmissions for different antenna ports over a set of RS resource elements using code division multiplexing (CDM) that spreads the RS transmissions in both a time dimension and a frequency dimension. In some examples, the spreading in the frequency dimension may be based on discrete Fourier transformation spreading. In some examples, the time dimension and the frequency dimension may have a one-to-one correspondence allowing for advantageous relationships between and operations relating to the two dimensions. The first device may transmit a spreading factor or related information associated with the CDM group based on the multiplexing to a second device.

A second device may receive and demultiplex the RS transmissions for the different antenna ports. The demultiplexing may be based at least in part on a received CDM pattern, an antenna rank, a RS type, or other information. In some examples, the demultiplexing may be based on an operating signal-to-noise ratio (SNR) level of the control/data channel to be decoded, a determined SNR, a signal-to-noise-interference-ratio, an interference level, a type of a RS, or other information. The second device may select a characteristic related to the CDM to demultiplex the RS transmissions, such as a time dimension, a frequency dimension, or both. In some examples, the second device may receive a spreading factor from the first device.

A method of wireless communication is described. The method may include receiving RS transmissions for different antenna ports, where the RS transmissions are multiplexed over a set of resource elements (REs) using a CDM group that is spread in a time dimension and a frequency dimension and performing RS processing based on at least a portion of the set of REs.

An apparatus is described. The apparatus may include a processor, memory in electronic communication with the processor, and instructions stored in the memory. The instructions may be operable to cause the processor to receive RS transmissions for different antenna ports, where the RS transmissions are multiplexed over a set of REs using a CDM group that is spread in a time dimension and a frequency dimension and perform RS processing based on at least a portion of the set of REs.

Some examples of the method and apparatus described above may further include processes, features, or instructions for demultiplexing the RS transmissions based on the CDM group.

Some examples of the method and apparatus described above may further include processes, features, or instructions for determining an interference level associated with at least one of the orthogonal frequency-division multiplexing (OFDM) symbols containing the RS transmissions. Some examples of the method and apparatus described above may further include processes, features, or instructions for selecting at least one of the time dimension or the frequency dimension over which to demultiplex the RS transmissions based on the determined interference level.

Some examples of the method and apparatus described above may further include processes, features, or instructions for determining a type of at least one of the RS transmissions. Some examples of the method and apparatus described above may further include processes, features, or instructions for selecting at least one of the time dimension or the frequency dimension over which to demultiplex the RS transmissions based on the determined type.

Some examples of the method and apparatus described above may further include processes, features, or instructions for determining an operating SNR level of a data channel to be decoded based on a RS transmission. Some examples of the method and apparatus described above may further include processes, features, or instructions for selecting at least one of the time dimension or the frequency dimension over which to demultiplex the RS transmissions based on the specified SNR.

In some examples of the method and apparatus described above, a spreading factor of the time dimension and a spreading factor of the frequency dimension are equal. In some examples of the method and apparatus described above, the frequency dimension is based on discrete Fourier transformation (DFT) spreading.

In some examples of the method and apparatus described above, the spreading sequence in the time dimension and the spreading sequence in the frequency dimension may have a one-to-one correspondence. Some examples of the method and apparatus described above may further include processes, features, or instructions for processing at least some of a set of OFDM symbols associated with at least one of the RS transmissions before a last OFDM symbol from the set is received.

In some examples of the method and apparatus described above, the set of REs includes a set of OFDM symbols and each RS transmission is multiplexed over each OFDM symbol.

A method of wireless communication is described. The method may include multiplexing RS transmissions for different antenna ports over a set of REs using a CDM group spreading in a time dimension and a frequency dimension and transmitting the RS transmissions over the set of REs based at least in part on the multiplexing.

A further apparatus is described. The apparatus may include a processor, memory in electronic communication with the processor, and instructions stored in the memory. The instructions may be operable to cause the processor to multiplex RS transmissions for different antenna ports over a set of REs using a CDM group spreading in a time dimension and a frequency dimension and transmit the RS transmissions over the set of REs based at least in part on the multiplexing.

Some examples of the method and apparatus described above may further include processes, features, or instructions for transmitting a spreading factor associated with the CDM group based on the multiplexing.

In some examples of the method and apparatus described above, a spreading factor of the time dimension and a spreading factor of the frequency dimension are equal. In some examples of the method and apparatus above, the frequency dimension is based on DFT spreading. In some examples of the method and apparatus described above, the spreading sequence in the time dimension and the spreading sequence in the frequency dimension may have a one-to-one correspondence.

DETAILED DESCRIPTION

Figure 1:
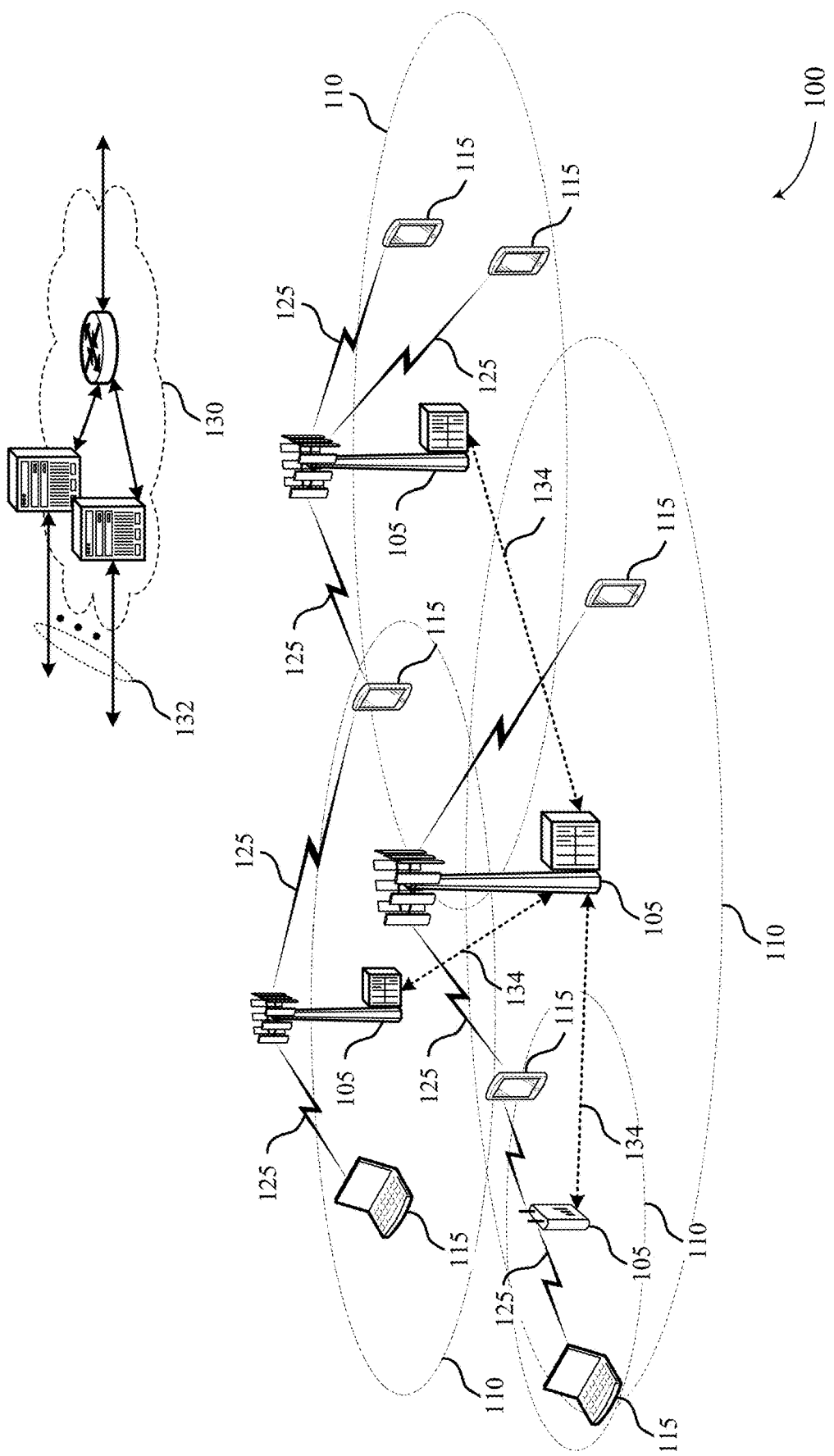
FIG. 1 illustrates an example of a wireless communications system that supports unified RS design in accordance with one or more aspects of the present disclosure.

In some systems and methods, different RSs (e.g., cell-specific reference signal (CRS), user equipment reference signal (VERS), uplink demodulation reference signal (UL DMRS), channel state information reference signal (CSI-RS), sounding reference signal (SRS)) have different antenna port multiplexing structures that may lead to using various methods to be performed using reference-signal specific components and operations. In many cases, each of the different RS may entail using specific multiplexing and demultiplexing operations based on the distinct RS type. This increases the complexity of the designated hardware, related software, and steps to process and use the RSs. Moreover, additional problems may occur based on the interaction between legacy systems and the new systems, methods, and techniques.

The described techniques relate to improved methods, systems, devices, or apparatuses that support unified designs for multiplexing RS transmissions over multiple antenna ports, which may apply to eCC and other various implementations such as LAACCs, NR systems (e.g., 5G), MuL-TEFire networks, etc. This disclosure should not be construed as being limited to eCC-related designs or implementations, and the concepts described in the disclosure apply broadly to wireless communication systems and techniques. Generally, the described techniques provide for unified RS processing, multiplexing, and demultiplexing techniques.

In some examples, the methods and the techniques may include a first device multiplexing RS transmissions using a CDM group that spreads the RS transmissions in both time and frequency dimensions. In some examples, the spreading in the frequency dimension may be based on discrete Fourier transformation spreading. In some examples, the time dimension and the frequency dimension may have a one-to-one correspondence allowing for advantageous relationships and operations based on the relationship between the two dimensions. The first device may transmit a spreading factor or related information associated with the CDM group based on the multiplexing to a second device.

A second device may receive and demultiplex RS transmissions for one or more different antenna ports. The demultiplexing may be based at least in part on a received CDM pattern, an antenna rank, a RS type, or other information. In some examples, the demultiplexing may be based on an operating SNR level of the associated control/data channel to be demodulated and decoded based on the RS, an interference level, a RS type, or other information. The second device may select a characteristic related to the CDM group to demultiplex the RS transmissions, such as a time dimension, a frequency dimension, or both. In some examples, the second device may receive a spreading factor from the first device. Each of the first device and the second device may be an example of a base station, an access point, or a UE—among other examples.

By way of example, the unified design may, among other advantages, reduce unintended beamforming, increase interference estimation accuracy, preserve peak-to-average-power ratio (PAPR) information, enable channel estimation (CE) using a subset of OFDM symbols despite bursty interference, enable early processing of OFDM symbols.

Aspects of the disclosure are initially described in the context of a wireless communication system. One example involving communication and related operations between a first device (e.g., an base station) and a second device (e.g., a UE) are described. Examples relating to the operations of a first device and a second based on the presence of an interference or a noise source are also described. Examples of RS and CDM group configurations are described. Other examples relate to process flows for a system that supports uniform RS processing and related functions. Aspects of the disclosure are further illustrated by and described with reference to apparatus diagrams, diagrams, and flowcharts that relate to unified RS design for eCCs.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network, or a NR network. For example, wireless communications system 100 may include an LTE/LTE-A network, a MuLTEFire network, a neutral host small cell network, or the like, operating with overlapping coverage areas. A MuLTEFire network may include access points (APs) and/or base stations 105 communicating in an unlicensed radio frequency spectrum band, e.g., without a licensed frequency anchor carrier. For example, the MuLTEFire network may operate without an anchor carrier in the licensed spectrum. In some cases, wireless communications system 100 may support enhanced broadband communications, ultra-reliable (i.e., mission critical) communications, low latency communications, and communications with low-cost and low-complexity devices. In some examples, a MuLTEfire communications system may support UE with coverage enhancement mode. Additionally, a MuLTEfire communications system may include and support different UE types. One UE type may be a legacy UE that may be deficient of capabilities related to a coverage enhancement mode. Additionally or alternatively, another UE type may be a MuLTEfire UE that may possess capabilities related to coverage enhancement mode. In some examples, the wireless communications system 100 may be an eCC based network, which may be an example of an unlicensed, wideband carrier network having distinct OFDM numerology and other features. In some examples, the methods and the techniques may include a first device multiplexing RSs using CDM that spreads the RSs a time dimension and a frequency dimension. A second device may receive the RS transmissions for one or more different antenna ports and may demultiplex the received RS transmissions. The demultiplexing may be based on various factors, such as a received CDM pattern, an antenna rank, a RS type a determined SNR, a signal-to-noise-interference-ratio, an interference level, a type of a RS, or other information.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions). The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like. Base stations 105 may also be MuLTE-Fire base stations 105, which may have limited or non-ideal backhaul links 134 with other base stations 105.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases position information for a MTC device may be provided that may allow a MTC device to be located, which may be beneficial for navigation or device location, for example. Furthermore, in cases where MTC devices use shared radio frequency spectrum, various techniques may support configuring a physical downlink control channel (PDCCH) and Hybrid automatic repeat request (HARM) feedback to enhance coverage to the MTC devices using shared radio frequency spectrum.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved node Bs or eNodeBs (eNBs) 105.

A base station 105 may be connected by an S1 interface to the core network 130. The core network may be an evolved packet core (EPC), which may include at least one Mobility Management Entity (MME), at least one serving gateway (S-GW), and at least one packet data network gateway (P-GW). The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105-a may include subcomponents such as an access network entity 105-b, which may be an example of an access node controller (ANC). Each access network entity 105-b may communicate with a number of UEs 115 through a number of other access network entities 105-c, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and an access network entity 105-b, or other access network entities 105-c, or core network 130 supporting radio bearers for user plane data. At the Physical (PHY) layer, transport channels may be mapped to physical channels.

Time intervals in LTE or NR may be expressed in multiples of a basic time unit (which may be a sampling period of Ts=1/30,720,000 seconds). Time resources may be organized according to radio frames of length of 10 ms (Tf=307200 Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a CC, a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 (e.g., a LTE system, or a NR system (e.g., 5G)) may utilize eCCs to, for example, improve throughput, latency, or reliability of wireless communications. An eCC may be characterized by one or more features including: wide tone spacing, short subframe duration, operation in a contention-based radio frequency spectrum band (or in a contention-free radio frequency spectrum band), shorter symbol duration, shorter TTIs (e.g., slots), modified control channel configuration, and wider bandwidth. An eCC may have a relatively wide bandwidth (e.g., 80 MHz or 100 MHz) as compared to a non-eCC (e.g., an LTE/LTE-A CC, LAA CC, or Stand Alone CC in a contention-based radio frequency spectrum band), which may have a relatively smaller bandwidth (e.g., 20 MHz). An eCC may include one or more channels (e.g., segments of bandwidth, such as four 20 MHz segments of bandwidth). eCC characterized by wide bandwidth may include one or more segments that may be utilized by UEs 115 that are not capable of monitoring the whole bandwidth or prefer to use a limited bandwidth (e.g., to conserve power). In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 μs). A TTI in eCC may consist of one or multiple symbols. In some cases, the TTI duration (that is, the number of symbols in a TTI) may be variable.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. In some examples, wireless communications system 100 may employ MuLTE-fire communications operating in a stand-alone manner using shared radio frequency spectrum. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, or TDD, or a combination of both.

Figure 2:
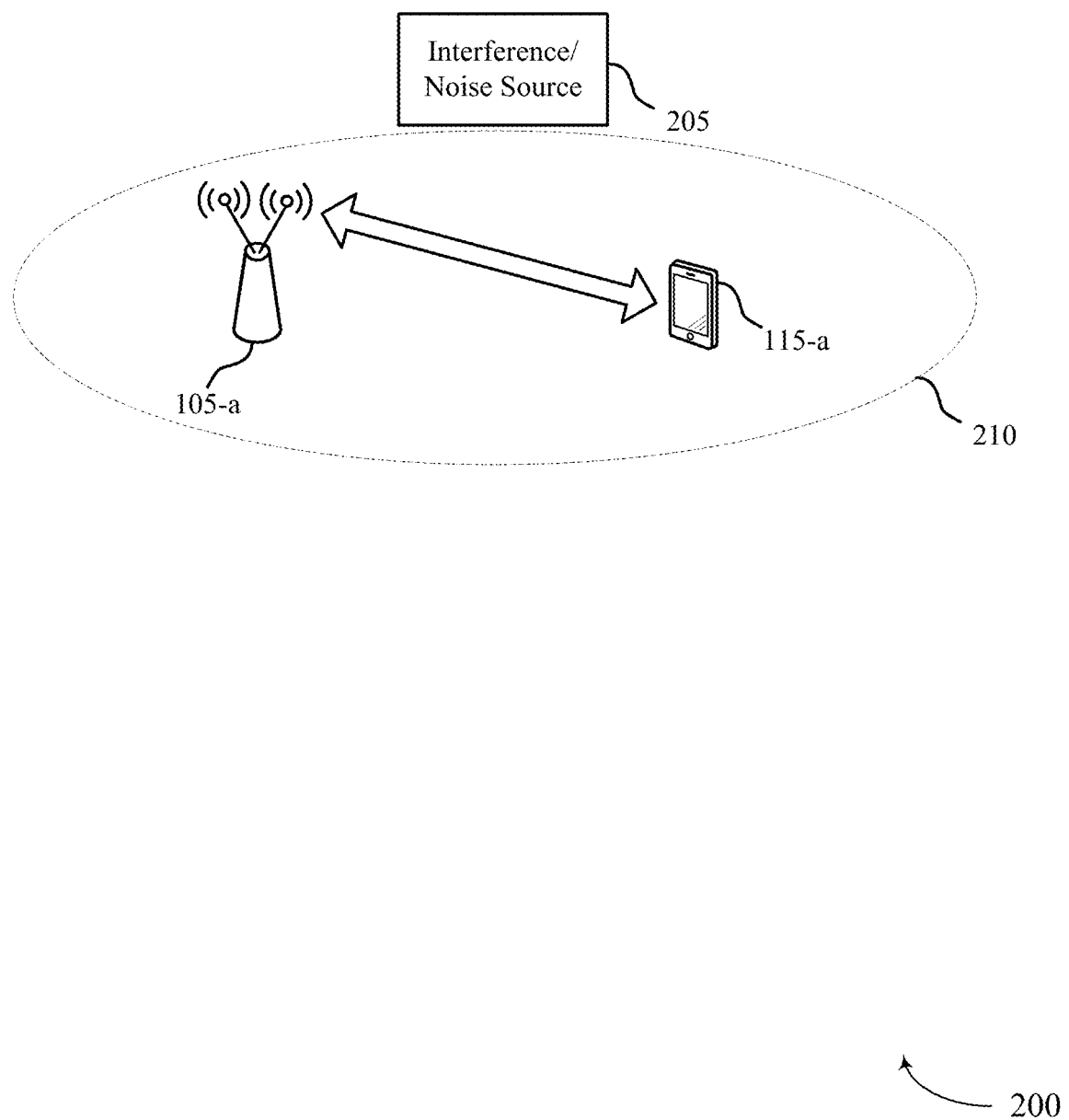
FIG. 2 illustrates an example of a wireless communications system that supports unified RS design in accordance with one or more aspects of the present disclosure.

FIG. 2 illustrates an example of a wireless communications system 200 for unified RS design. Wireless communications system 200 may include base station 105-a and UE 115-a, which may be examples of the corresponding devices described with reference to FIG. 1, and interference/noise source 205. In other examples, wireless communications system 200 may include base station 105-a and UE 115-a, which may each be examples of different devices or components described with reference to FIG. 1 (e.g., actions described as performed by base station 105-a may be performed by a UE, actions described as performed by UE 115-a may be performed by a base station). Wireless communications system 200 may represent a system that supports enhanced RS multiplexing and demultiplexing using one or more CDM groups. In some examples, the one or more CDM groups may include a time domain spreading and a frequency domain spreading.

In wireless communications system 200, a transmitting device such as base station 105-a may multiplex RS transmissions for different antenna ports using one or more CDM groups spreading communications. As one example, base station 105-a may multiplex RS transmissions for different antenna ports over a set of resource elements using a first group spreading. These antenna ports may not necessarily correspond to physical antennas, but rather may be logical entities differentiated by RS sequences. Multiple antenna port signals can be transmitted on a single transmit antenna or a single antenna port can be spread across multiple transmit antennas. In some examples, each antenna port may correspond to one or more physical antennas of base station 105-*a*. In alternative embodiments, each antenna port may not correspond to a physical antenna of an AP, but may instead be spread across multiple physical antennas or may be shared on one or more physical antennas.

In some examples, the CDM group spreading may include spreading in at least one of a time dimension and a frequency dimension. In some cases, the CDM group time dimension may be based on Walsh codes—among other information. The CDM group may be associated with a distinct spreading factor (e.g., 2, 4). In some examples, the frequency dimension spreading may be based DFT spreading or other methods.

In some examples, base station 105-*a* may receive or generate RS transmissions for different antenna ports. Base station 105-*a* may multiplex (e.g., spread) the RS transmissions for the different antenna ports over a set of resource elements. A resource element may be defined by the index pair (k, l), where k is a subcarrier index and l is an OFDM symbol index.

In some examples, the multiplexing may be based on a CDM group spreading the pilot symbol on an antenna port in a time dimensions and a frequency dimension. After the RS transmissions are multiplexed, base station 105-*a* may transmit the RS transmissions over the set of resource elements to the UE 115-*a* based at least in part on the multiplexing.

UE 115-*a* then receives RS transmissions for one or more different antenna ports. In some examples, the RS transmissions are multiplexed using a CDM group that is spread in a time dimension and a frequency dimension. UE 115-*a* then performs RS processing based on at least a portion of the received set of resource elements.

In some examples, the time dimension and the frequency dimension may have a one-to-one correspondence allowing for advantageous relationships and operations based on the relationship between the two dimensions. For example, if the spreading factor is four in time and four in frequency, there are sixteen spreading sequence combinations, which allows multiplexing of up to sixteen antenna ports as follows.

$$\begin{bmatrix}+1\\+1\\+1\\+1\end{bmatrix}[+1\ +1\ +1\ +1], \begin{bmatrix}+1\\+1\\+1\\+1\end{bmatrix}[+1\ -1\ +1\ -1],$$

$$\begin{bmatrix}+1\\+1\\+1\\+1\end{bmatrix}[+1\ +1\ -1\ -1], \begin{bmatrix}+1\\+1\\+1\\+1\end{bmatrix}[+1\ -1\ -1\ +1],$$

$$\begin{bmatrix}+1\\+j\\-1\\-j\end{bmatrix}[+1\ +1\ +1\ +1], \begin{bmatrix}+1\\+j\\-1\\-j\end{bmatrix}[+1\ -1\ +1\ -1],$$

$$\begin{bmatrix}+1\\+j\\-1\\-j\end{bmatrix}[+1\ +1\ -1\ -1], \begin{bmatrix}+1\\+j\\-1\\-j\end{bmatrix}[+1\ -1\ -1\ +1],$$

-continued $$\begin{bmatrix}+1\\-1\\+1\\-1\end{bmatrix}[+1\ +1\ +1\ +1], \begin{bmatrix}+1\\-1\\+1\\-1\end{bmatrix}[+1\ -1\ +1\ -1],$$

$$\begin{bmatrix}+1\\-1\\+1\\-1\end{bmatrix}[+1\ +1\ -1\ -1], \begin{bmatrix}+1\\-1\\+1\\-1\end{bmatrix}[+1\ -1\ -1\ +1],$$

$$\begin{bmatrix}+1\\-j\\-1\\+j\end{bmatrix}[+1\ +1\ +1\ +1], \begin{bmatrix}+1\\-j\\-1\\+j\end{bmatrix}[+1\ -1\ +1\ -1],$$

$$\begin{bmatrix}+1\\-j\\-1\\+j\end{bmatrix}[+1\ +1\ -1\ -1], \begin{bmatrix}+1\\-j\\-1\\+j\end{bmatrix}[+1\ -1\ -1\ +1]$$

To demultiplex the sixteen antenna ports, the receiver will have to rely on despreading over both time and frequency dimensions. However, by having a one-to-one correspondence, we associate a particular frequency domain spreading sequence with a given time domain sequence, allowing only the following four spreading sequence combinations:

$$\text{Port 0: }\begin{bmatrix}+1\\+1\\+1\\+1\end{bmatrix}[+1\ +1\ +1\ +1], \text{Port 2: }\begin{bmatrix}+1\\-1\\+1\\-1\end{bmatrix}[+1\ +1\ -1\ -1]$$

$$\text{Port 1: }\begin{bmatrix}+1\\+j\\-1\\-j\end{bmatrix}[+1\ -1\ +1\ -1], \text{Port 3: }\begin{bmatrix}+1\\-j\\-1\\+j\end{bmatrix}[+1\ -1\ -1\ +1]$$

In some examples, with this approach one dimension may be redundant because of the other dimension. This allows the receiver to be able to demultiplex different antenna ports by despreading either in time or frequency domain.

In some examples, UE 115-*a* demultiplexes the RS transmissions based on a CDM group, which may be based on demultiplexing in at least one of a time dimension and a frequency dimension. The demultiplexing may be based at least in part on a received CDM pattern, antenna rank, RS type, or other information. In some examples, the demultiplexing may alternatively or additionally be based on a determined SNR, a signal-to-noise-interference-ratio, an interference level, a type of a RS, or other information.

The UE 115-*a* may select a characteristic related to the CDM group to demultiplex the RS transmissions. In some cases, the characteristic may include, but is not limited to, a time dimension, a frequency dimension, or both. In some examples, UE 115-*a* may receive a spreading factor from base station 105-*a*. This spreading factor may be associated with the CDM group used to multiplex the RS transmissions.

In some examples, UE 115-*a* may process at least some of a set of OFDM symbols associated with at least one of the RS transmissions before a last OFDM symbol from the set is received. For example, UE 115-*a* may process (e.g., demultiplex, separate, perform one or more determinations related to) at least some OFDM symbols based on the techniques and the methods disclosed.

As one example, the techniques may facilitate early processing of at least some OFDM symbols to reduce processing delay times. In some cases, the processing may include demultiplexing each symbol upon receipt by UE 115-a. In other cases, the processing may include separating or demultiplexing at least one OFDM symbol in a set before the last symbol in the set has been received by UE 115-a. In some cases, the processing may include processing multiple OFDM symbols in a set within a predetermined time of when UE 115-a received a specified symbol in the set or a number of symbols in the set. In this way, receiver processing time may be conserved and delay may be minimized—by processing each OFDM symbol as much as possible without waiting to receive all the OFDM RS symbols in the set.

In some examples, one advantage based on the these techniques relates to inverse fast Fourier transform (IFFT)—filtering—fast Fourier transform (FFT) based channel estimation. The techniques and designs permit an IFFT, filtering, and a FFT to be performed after receiving one, some, or all of the OFDM symbols. Using DFT spreading in the frequency domain causes a circular or a measured shift of time domains channel taps—meaning that DFT-spreading preserves the shape of the time domain taps. FFT is one implementation of DFT. In some examples, performing IFFT on each symbol generates shifted time-domain taps that are similar in some characteristics (e.g., shape, magnitude), but are shifted in time for each different antenna ports.

For example, in a rank four case based on a CDM group multiplexing in a time domain and a frequency domain, performing IFFT generates time-shifted channel taps corresponding to the different antenna port. For example, for the spreading factor of four, this means that the channel taps obtained via IFFT will be a shifted version of the original channel taps. As one example, IFFT may generate shifted time-domain taps as follows:
  channel taps corresponding to antenna port 0 is within the first quarter of tap indices;
  channel taps corresponding to antenna port 1 is within the second quarter of tap indices;
  channel taps corresponding to antenna port 2 is within the third quarter of tap indices; and
  channel taps corresponding to antenna port 3 is within the fourth quarter of tap indices.

In some cases, windowing operation on channel taps enables a device to provide a channel estimate related to the one or more ports across the different symbols. For example, windowing on the second quarter of taps and zeroing taps outside the window on each symbol will provide a channel estimate related to port 1.

Another advantage of methods and techniques employing DFT spreading in a frequency domain, is that the PAPR for UL DMRS may be preserved under antenna port multiplexing. As described above, employing DFT spreading in a frequency domain essentially causes a circular or a measured shift in time that will not alter the PAPR for the UL DMRS. This is different from other methods that may rely on FDM multiplexing or CDM in a frequency domain. These other methods do not preserve the PAPR—and in fact increase PAPR—and cause performance degradation due to transmit power back-off.

By using DFT-spreading in at least the frequency domain, the shape of the shifted time-domain taps from the different symbols and the PAPR for UL DMRS are preserved. In some cases, each antenna port may use multiple or all the available subcarriers, which does not increase PAPR due to spreading the average power transition across the used subcarriers. Although DFT spreading provides one example of the methods and the techniques related to the CDM group and the frequency domain as described here, this example is not limiting and other examples are contemplated.

In some examples, a UE may be subject to interference from nearby nodes. In such a case, it is beneficial for the UE to accurately capture the interference level and the spatial characteristics of the interference. As one example, UE 115-a may receive transmissions (e.g., of rank two) from base station 105-a using a CDM group spread in a time domain (e.g., across two RS symbols) and a frequency domain, and interference/noise source 205 may also be transmitting such that UE 115-a receives interfering transmissions (e.g., of rank four) from 205 across four RS symbols.

In such scenario, other techniques and methods may not adequately capture the spatial characteristics of interference on the transmissions from interference/noise source 205 and may lead to performance degradation, but the methods and the techniques disclosed here may prevent this degradation. The UE 115-a may rely on the first two symbols of the received RSs to estimate interference, whereas the interfering node is transmitting RS over four symbols. In other less-effective RS designs, this may cause UE 115-a to capture interference contained in only two spatial layers of the interfering transmission(s), whereas the interfering transmission(s) may span four spatial layers. Thus, interference estimation based on RS is mismatched from the true interference.

Using the present techniques, however, may prevent mismatched interference estimation. As one example, a potential CDM pattern for base station 105-a (e.g., a serving device) may include:

$$\text{Port 0: } \begin{bmatrix} +1 \\ +1 \end{bmatrix} [+1 \quad +1]$$

$$\text{Port 1: } \begin{bmatrix} +1 \\ -1 \end{bmatrix} [+1 \quad -1]$$

A potential CDM pattern for interference/noise source 205 (e.g., an interfering device) may include:

$$\text{Port 0: } \begin{bmatrix} +1 \\ +1 \\ +1 \\ +1 \end{bmatrix} [+1 \quad +1 \quad +1 \quad +1], \text{Port 2: } \begin{bmatrix} +1 \\ -1 \\ +1 \\ -1 \end{bmatrix} [+1 \quad +1 \quad -1 \quad -1]$$

$$\text{Port 1: } \begin{bmatrix} +1 \\ +j \\ -1 \\ -j \end{bmatrix} [+1 \quad -1 \quad +1 \quad -1], \text{Port 3: } \begin{bmatrix} +1 \\ -j \\ -1 \\ +j \end{bmatrix} [+1 \quad -1 \quad -1 \quad +1]$$

The first two symbols of the interference/noise source 205 received by the UE 115-a may include all the four dimensions relating to the rank four transmission, allowing for each of the four different spatial layers to be contained in the two received symbols. In this case, because each symbol of the interference/noise source 205 may include the four different layers, when the UE 115-a measures interference based on the first two symbols it will still be able to fully estimate the spatial characteristics of interference that consists of four spatial layers.

Figure 3C:
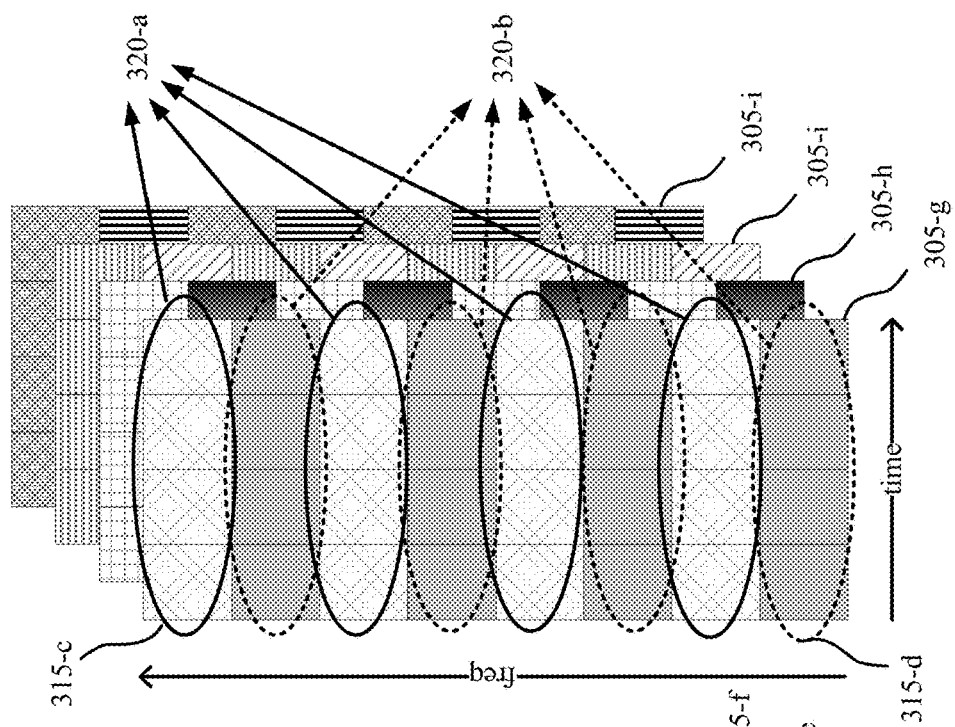
FIGS. 3A, 3B, and 3C illustrate examples of RS designs that support unified RS designs in accordance with one or more aspects of the present disclosure.
Figure 3B:
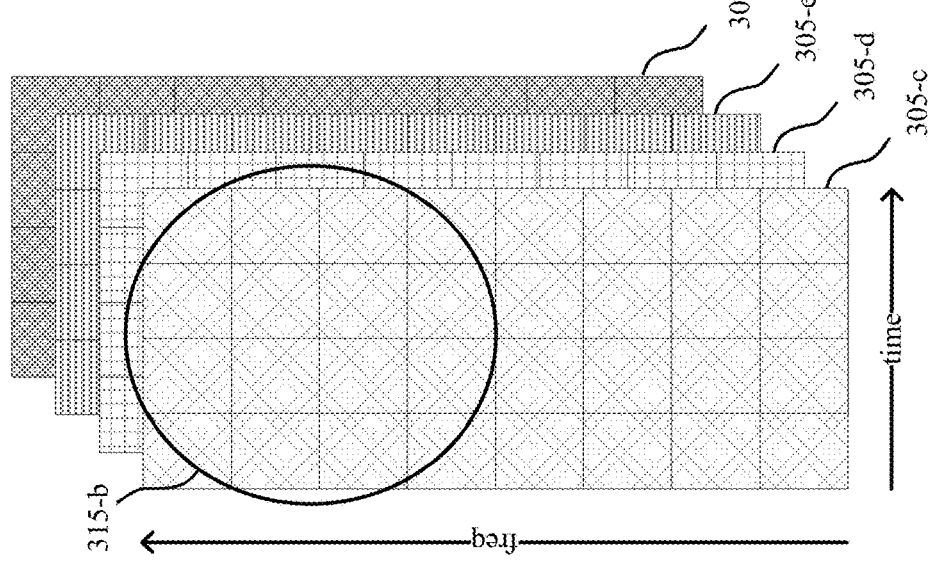
Figure 3A:
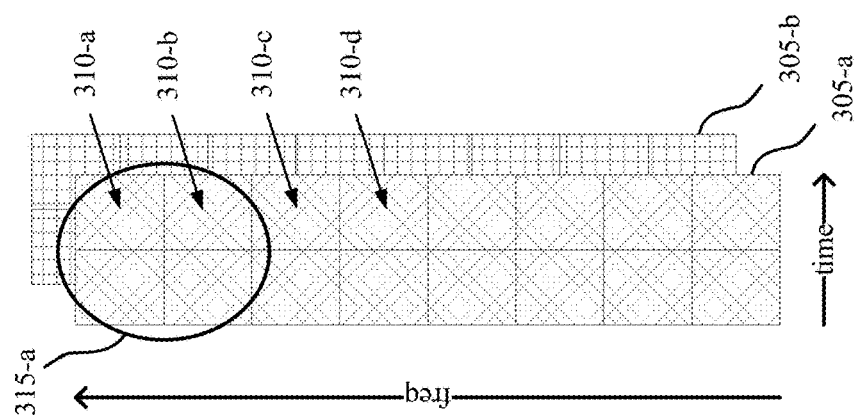

FIGS. 3A, 3B, and 3C illustrate examples of RS and CDM group configurations 300-a, 300-b, and 300-c for unified RS design (e.g., for eCCs). In some cases, examples of RS and CDM group configurations 300-a, 300-b, and 300-c may represent aspects of techniques performed by a UE 115 or base station 105 as described with reference to FIGS. 1-2.

In some examples, each time-frequency grid (e.g., grid 305-a, grid 305-c, grid 305-f) may relate to a different antenna port and each grid may include or be associated with a set of resource elements (resource element 310-a, resource element 310-b, resource element 310-c, etc.). Each group of time-frequency grids—that may each relate to a different antenna port—may be based on an antenna rank, such as rank two, rank four, rank eight, etc. Based on the antenna rank, the reference signal type, and other applicable parameters, different reference signals are assigned different resource elements within a subframe according to a standard. In some cases, these resource elements are assembled into time-frequency grids. Each time-frequency grid represents the set of resource elements that are allocated to a particular type of reference signal within a subframe. The different layers shown for each grid each represent one or more transmissions over different antenna ports. The use of grids is not intended to imply that the resource elements must be adjacent within the subframe or organized in the orientation shown. In many cases, the resource elements assigned to a particular reference signal are not adjacent to each other within the subframe.

In some examples, each set of time-frequency grids may be based on one or more CDM groups (e.g., CDM group 315-a, CDM group 315-b) such that the antenna ports are being or have been multiplexed. In some cases, the CDM group may include one or more subcarriers, one or more OFDM symbols, or both. For example, CDM group 315-a may cover at least two subcarriers and at least two OFDM symbols. In some cases, a CDM group may cover a different number of subcarriers and symbols.

In some examples, each CDM group may cover a predetermined number of resource elements. As one example, CDM group 315-b covers four OFDM symbols in time and four subcarriers in frequency, thus covering sixteen total resource elements. As another example, CDM group 315-a covers two OFDM symbols in time and two subcarriers in frequency, thus covering four total resource elements.

In some examples, the number of time elements in a given time-frequency grid may be different from the number of frequency elements in the given time-frequency grid. In some examples, the time dimension CDM sequences and the frequency dimension CDM sequences may have a different length or number of elements. In other examples, the time dimension CDM sequences and the frequency dimension CDM sequences may have the same length. In some examples, when they have the same length, the time dimension CDM sequences and the frequency dimension CDM sequences may have one-to-one correspondence, such that each time domain sequence is associated with a corresponding frequency domain sequence. In this case, the one-to-one correspondence allows for reliance on one domain type when the other domain type may be at least partially unusable.

For example, when bursty interference, increased noise, or another adverse condition occurs at least a part of the time domain symbols may be unusable due to the interference or noise. But because of the one-to-one correspondence between the time domain sequence and the frequency domain sequence—as merely one example—the frequency domain may be used to demultiplex the RS transmissions when the time domain is unusable.

In some cases, multiplexing different antenna ports using a CDM group (e.g., CDM group 315-b, CDM group 315-a) may be based on a spreading pattern across time and frequency. For example, for CDM group 315-a shown in FIG. 3A, the different ports may have a spreading pattern across time and frequency. An exemplary CDM spreading pattern may include:

$$\text{Port 0: } \begin{bmatrix} +1 \\ +1 \end{bmatrix} [+1 \ +1]$$

$$\text{Port 1: } \begin{bmatrix} +1 \\ -1 \end{bmatrix} [+1 \ -1]$$

In this example, the time domain sequence [+1 +1] is associated with the frequency domain sequence [+1 +1], and the time domain sequence [+1 −1] is associated with the frequency domain sequence [+1 −1]. This allows the receiver to demultiplex the two ports by descrambling over frequency domain even if one of the two symbols is unusable due to strong interference.

In some cases, this CDM pattern may be used for specified RS types, while in other cases this CDM pattern may be applicable to various RS types. For example, this CDM pattern may be used for CRS, UERS, uplink demodulation reference signal (DMRS) for PUSCH, and CSI-RS types, among other types.

One advantage—among others—of using various CDM patterns for mutliplexing in a time domain and a frequency domain includes reducing unintended beamforming, which may occur using particular configurations of TDM designs or CDM time-only designs. For example, consider the following design which has CDM over time-only:

Port 0: [+1 +1]
Port 1: [+1 −1]

On the first symbol, the transmission creates a beamforming along the direction of h0+h1, and on the second symbol, the transmission creates a beamforming along the direction of h0−h1. Here, h0 represents the channel from Port 0 to the receive antennas at the second node, and h1 represents the channel from Port 1 to the receive antennas at the second node. These other designs may generate more directional interference leading to performance degradation at neighboring nodes. This time-varying interference may also adversely impact coexistence within the medium itself as well as interference estimation accuracy.

In light of the methods and the techniques disclsoed here, using various CDM patterns for mutliplexing in a time domain and a frequency domain avoids the unintended beamforming that may occur with other methods. One technique for this configuration includes having each OFDM symbol carry a similar or the same beamforming pattern—creating uniformity and related uniform interference through a subset or an entire set of OFDM symbols. As an illustration, the proposed design that has CDM over both time and frequency $$\text{Port 0: } \begin{bmatrix} +1 \\ +1 \end{bmatrix} [+1 \ +1]$$

$$\text{Port 1: } \begin{bmatrix} +1 \\ -1 \end{bmatrix} [+1 \ -1]$$

contains both beam directions h0+h1 and h0−h1 within each symbol, meaning that the transmission is omni-directional within the active spatial layers and does not change across symbols.

As another example, for CDM group 315-*b* shown in FIG. 3B the different ports may also have a spreading pattern across time and frequency. An exemplary CDM spreading pattern may include:

$$\text{Port 0: } \begin{bmatrix} +1 \\ +1 \\ +1 \\ +1 \end{bmatrix} [+1 \ +1 \ +1 \ +1], \text{Port 2: } \begin{bmatrix} +1 \\ -1 \\ +1 \\ -1 \end{bmatrix} [+1 \ +1 \ -1 \ -1]$$

$$\text{Port 1: } \begin{bmatrix} +1 \\ +j \\ -1 \\ -j \end{bmatrix} [+1 \ -1 \ +1 \ -1], \text{Port 3: } \begin{bmatrix} +1 \\ -j \\ -1 \\ +j \end{bmatrix} [+1 \ -1 \ -1 \ +1]$$

In this example, using four different antenna ports provides a specified spreading pattern across time and frequency for port 0, port 1, port 2, etc. And, by using this CDM pattern—which is merely one example—four different possibilities exist in time and four different possibilities exist in frequency, which allows for sixteen total possibilities of spreading across time and frequency. However, with one-to-one correspondence between the time and frequency domain spreading, only four combinations (that is, Port 0, 1, 2, and 3) are utilized out of sixteen possibilities.

In some cases, a CDM pattern for each port will include a different grid (e.g., a 2×2 grid, a 4×4 grid) with different characteristics that may affect transmitting one or more RSs or other information. For example, in trying to transmit a UERS downlink, the technique may include multiplying a 4×4 grid for each port (e.g., port 0, port 1) and then transmitting the result on the corresponding antenna port (e.g., port 0, port 1). In some cases, based at least in part on the antenna rank (e.g., rank four), the technique may include transmitting the summation of the four resulting multiplexed patterns to the second device.

Using various CDM patterns—including the pattern shown above—each time domain sequency may be associated with a distinct frequency domain sequence (up to four different dimensions). In some examples, a receiving device may then rely on time-domain demultiplexing to separate the different antenna port signal transmissions, independent of any frequency-domain demultiplexing. Alternatively, a receiving device may rely on time-domain demultiplexing and frequency-domain demultiplexing. Although antenna rank four is described here as one example other antenna ranks, including rank N, are contemplated.

In some cases, this CDM pattern may be used for designated RS types. For example, this CDM pattern may be used for CRS, UERS, DMRS for PUSCH, and CSI-RS, among other types.

In some examples, techniques may include multiplexing different ports (and related antenna signals) in an orthogonal manner, meaning the design could use different time-frequency grids each relating to a different port. As one example, as shown in FIG. 3B the disclosed techniques could include multiplexing sixteen different ports (and related antenna signals) in an orthogonal manner, meaning the design could use sixteen different time-frequency grids each from a different port.

In some cases, the design of the CDM group use for the RS techniques may be based at least in part on the related antenna rank. For example, if the antenna rank is less than or equal to four, each CDM group may cover four OFDM symbols in time and four subcarriers in frequency. As another example, if the antenna rank is greater than four, each multiple CDM groups (e.g., a first CDM group, a second CDM group) may cover designated resource elements. For example, for the antenna rank eight example shown in FIG. 3C, a CDM group may cover sixteen resource elements, among other possibilities.

As another example, for CDM group 315-*b* shown in FIG. 3B, the different ports may also have a spreading pattern across time and frequency, but may use a distinct CDM pattern based at least in part on the type of the RS. An exemplary CDM spreading pattern may include:

Time domain spreading: $[+1 \ +1 \ +1 \ +1]$, $[+1 \ +1 \ -1 \ -1], [+1 \ -1 \ +1 \ -1], [+1 \ -1 \ -1 \ +1]$ $$\text{Freq domain spreading: } \begin{bmatrix} +1 \\ +1 \\ +1 \\ +1 \end{bmatrix}, \begin{bmatrix} +1 \\ -1 \\ +1 \\ -1 \end{bmatrix}, \begin{bmatrix} +1 \\ +j \\ -1 \\ -j \end{bmatrix}, \begin{bmatrix} +1 \\ -j \\ -1 \\ +j \end{bmatrix}$$

This pattern allows for multiplexing of up to sixteen antenna ports. In some cases, this CDM pattern may be used for designated RS types, such as DMRS for PUCCH, among others. Additionally, though this example may be used with an antenna rank four, a different number of combinations (e.g., eight) can be used based on the RS type or other characteristics.

In some examples, the receiving communication device may rely on time domain and frequency domain demultiplexing (e.g., despreading) to separate information and RSs related to different devices (e.g., UEs, STAs). For example, when a receiving communication device receives RS transmissions for different antenna ports related to DMRS for PUCCH, which may in some examples use up to sixteen dimensions based on the CDM pattern, the receiving communication device may rely on time domain and frequency domain demultiplexing to separate the different UEs.

In addition, as another example related to a dual CDM group design for CDM groups 315-*c* and 315-*d* shown in FIG. 3C, the different ports may each have a spreading pattern across time and frequency. In some examples, a first CDM group is multiplexed (e.g., spread) in a time dimension and a frequency dimensions and a second CDM group is multiplexed (e.g., spread) in a time dimension and a frequency dimension. In some cases, each CDM group may be associated with one or more subcarrier groups.

For example, the first CDM group may be associated with a first subcarrier group and the second CDM group may be associated with a second subcarrier group, and in some cases each subcarrier group may be different from the other. In some cases, each subcarrier group may be fully distinct from the other. For example, the first CDM group may occupy one or more odd subcarrier groups and the second CDM group may occupy one or more even subcarrier groups, or vice versa. An exemplary CDM spreading pattern may include:

Port {0,1,4,6} forms 4×4 CDM pattern over even subcarriers and four symbols.

Port {2,3,5,7} forms 4×4 CDM pattern over odd subcarriers and four symbols.

In some cases, this CDM pattern may be used for specified RS types, while in other cases this CDM pattern may be applicable to various RS types. For example, this CDM pattern may be used for CRS, UERS, DMRS for PUSCH, and CSI-RS, among other RS types.

Figure 4:
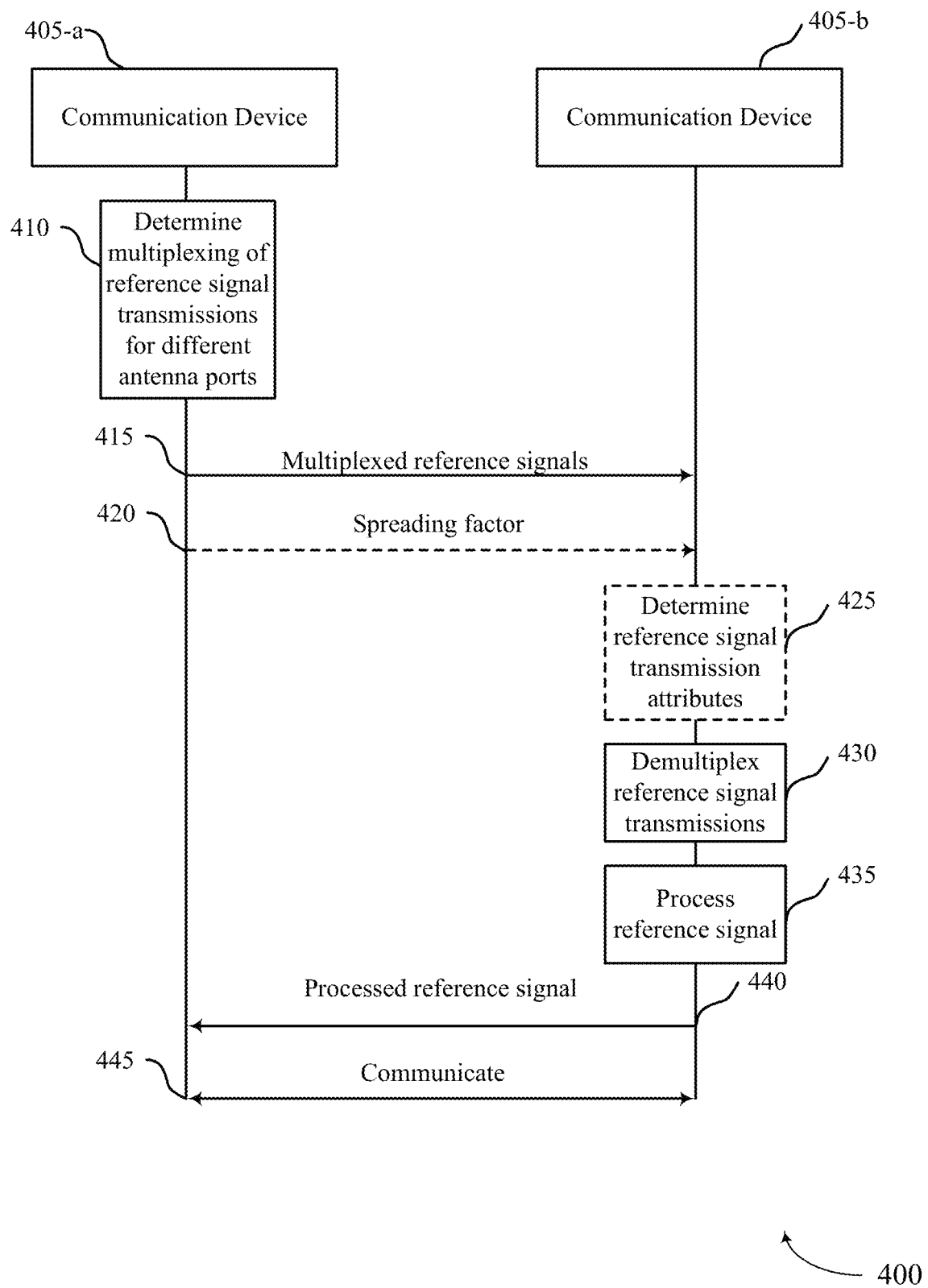
FIG. 4 illustrates an example of a process flow in a system that supports unified RS design in accordance with one or more aspects of the present disclosure.

FIG. 4 illustrates an example of a process flow 400 for unified RS design for eCCs in accordance with various aspects of the present disclosure. Process flow 400 may include communication device 405-*a* and communication device 405-*b*, which may each be examples of the devices described with reference to FIGS. 1-2, including, but not limited to base station 105 and UE 115. For example, one of the communication devices 405-*a*, 405-*b* may be a base station 105 and the other of the communication devices 405-*a*, 405-*b* may be a UE 115.

At block 410, communication device 405-*a* may determine a multiplexing of multiple RS transmissions corresponding to different antenna ports over a time-frequency grid allocated to a RS. The time-frequency grid over which the RS transmissions are multiplexed may represent a standardized subset of the reference elements available within an individual subframe. In some examples, this multiplexing may be based at least in part on using a CDM group spreading in at least one time dimension and at least one frequency dimension. This multiplexing may be based on one or more CDM patterns specific to one or more various ports or time-frequency grids.

Communication device 405-*a* may perform one or more multiplexed RS transmissions 415 to communication device 405-*b* according to the multiplexing determined in block 410. In some cases, each of the resource elements in the time-frequency grid allocated to the RS may include at least part of one or more RS transmissions. Communication device 405-*a* may also transmit spreading factor 420 or antenna rank information related to the multiplexing determined in block 410 to the communication device 405-*b*. In some cases, identifying information (e.g., antenna rank, reference signal type), relating to the RS is communicated from communication device 405-*a* to communication device 405-*b*. The communication of the identifying information may occur together with or separately from the multiplexed RS transmissions 415 or the communication of the spreading factor 420. For example, antenna rank for CRS may be communicated in the physical broadcast channel (PBCH). The antenna rank and spreading factor for UERS may be communicated via PDCCH. The reference signal type may be implicitly determined based on the symbol indices on which the reference signals are being transmitted.

At block 425, communication device 405-*b* may determine one or more transmission attributes. This determination or determinations may be based at least in part on the received multiplexed RS transmissions, the received one or more spreading factors and/or related antenna rank information, or other information. In some cases, the attributes may include an operating SNR level of the target control/data to be decoded based on the reference signal, an interference level on each symbol, a transmission type, or some combination—among other things. In some examples, the attributes may be based on the attributes of one or more multiplexed RS transmissions 415, the attributes of the target control/data channel to be decoded, the attributes of one or more past RS transmissions, or other past or current transmissions between two or more devices (e.g., communication device 405-*a*, communication device 405-*b*, other devices).

In some examples, the determination may be based on identifying an operating SNR level associated with one or more transmissions, including, but not limited to, the control/data transmissions associated with the RS. For example, by determining an operating SNR level of the associated control or data channel to be above a predetermined value (e.g., a high SNR) communication device 405-*b* may rely on only time domain demultiplexing (e.g., spreading) for one or more data channels. Conversely, by determining a SNR below a predetermined value (e.g., a low SNR) communication device 405-*b* may rely on both time domain demultiplexing (e.g., spreading) and frequency domain demultiplexing for one or more data channels (e.g., PUCCH). In some cases, determining a SNR may include determining an operating SNR level of a control channel or a data channel to be decoded based on a RS transmission. By determining the operating SNR level related to one or more channels to be decoded, the techniques may facilitate selecting at least one of the time dimension or the frequency dimension over which to demultiplex the RS transmissions based on the specified SNR.

In addition to or as an alternative to determining a SNR level associated with one or more transmissions, techniques may be based on detecting an interference level associated with an interference device (e.g., interference/noise source 205). By determining an interference level that may impact at least some of the OFDM symbols—or the RS transmission more broadly—particular demultiplexing techniques may be used.

For example, determining an interference level may include determining an interference level associated with at least one of the OFDM symbols containing RS transmissions, among other things. In this example, by determining an interference level that is below a predetermined value (e.g., a low interference level), communication device 405-*b* may rely on time domain demultiplexing (e.g., spreading) for one or more data channels. Alternatively, by determining an interference level above a predetermined value (e.g., a high interference level)—that may affect one or more symbols based on the interference level—communication device 405-*b* may rely on frequency domain demultiplexing for one or more data channels.

In some examples, the determination may be based on determining a type of one or more RS transmissions, and selecting and executing one or more demultiplexing techniques based at least in part on the determined type. For example, by determining a type of a RS, communication device 405-*b* may include selecting at least one of the time dimension or the frequency dimension over which to demultiplex the RS transmissions based at least in part on the determined type. As one example, by determining a type of a RS as UERS, DMRS, or SRS—among others—communication device 405-*b* may use time domain demultiplexing. Alternatively, by determining a type of a RS as DMRS associated with PUCCH—among others—communication device 405-*b* may use both time and frequency domain demultiplexing. Operations based on the type of at least one RS transmission may be based on one or more characteristics of the RS type, the particular RS received, or some combination, among other information.

At block 430, communication device 405-*b* may demultiplex RS transmissions. In some cases, the demultiplexing may be based at least in part on the spreading factor, the antenna rank, other identifying information, the determined one or more attributes, some combination of these. The demultiplexing may use the one or more CDM groups and one or more CDM patterns relating to the different antenna ports to demultiplex the received multiplexed RS transmissions.

In some examples, the demultiplexing may be based on information received from one or more symbols. In one example, the techniques described here may enable using a subset of the OFDM symbols containing the multiplexed RS transmissions (e.g., the multiplexed RS transmissions 415) despite the presence of interference (e.g., bursty interference). In some cases a first subset of the OFDM symbols may be impacted by strong bursty interference, while a second subset containing the remaining symbols are not. Using frequency dispreading these remaining symbols can be demultiplexed to differentiate the frequency-time grids and the related antenna ports despite the impacted symbols in the first subset.

As one example related to the example shown in FIG. 3B, the first subset of symbols (symbols {2, 3}) may be hit by bursty or other interference and the second subset of symbols (symbols {0, 1}) may be preserved. As a first action, port {0, 2} and {1, 3} can be separated using time domain despreading across symbols 0 and 1. As a later action, ports 0 and 2 (and ports 1 and 3) can be separated via frequency domain despreading across two subcarriers. In some cases, the two subcarriers may be consecutive.

As another example related to the example shown in FIG. 3B, the first subset of symbols (symbols {0, 2, 3}) may be hit by bursty or other interference and the second subset of symbols (symbol {1}) may be preserved. Port 0, 1, 2, and 3 can be separated via frequency domain despreading across the different subcarriers (e.g., four subcarriers), which in this case may include four consecutive subcarriers. Thus, the frequency domain may serve as an alternative or a redundant domain when the time domain despreading or other operations will be unsuccessful, diminished, or not possible due to interference, noise, or other conditions.

At block 435, communication device 405-*b* may process one or more parameters, attributes, or other information related to one or more RSs received from communication device 405-*a* or other devices. In some cases, the communication device 405-*b* may perform channel estimation and/or interference estimation (which may be used for demodulation), one or more measurements such as a reference signal received power (RSRP) and a reference signal received quality (RSRQ), one or more tracking loop operations such as time tracking loop (TTL) and frequency tracking loop (FTL), etc. In other cases, communication device 405-*b* may measure a signal strength, a signal quality, a RSRP, a receive strength signal indicator (RSSI), a RSRQ, some combination, or other information.

Communication device 405-*b* may then transmit the processed RS 440 to communication device 405-*a* or other devices to provide information regarding the previously transmitted multiplexed transmissions. Communication device 405-*a* and communication device 405-*b* may then communicate 445 with each other based at least in part on the RS processing.

Figure 5:
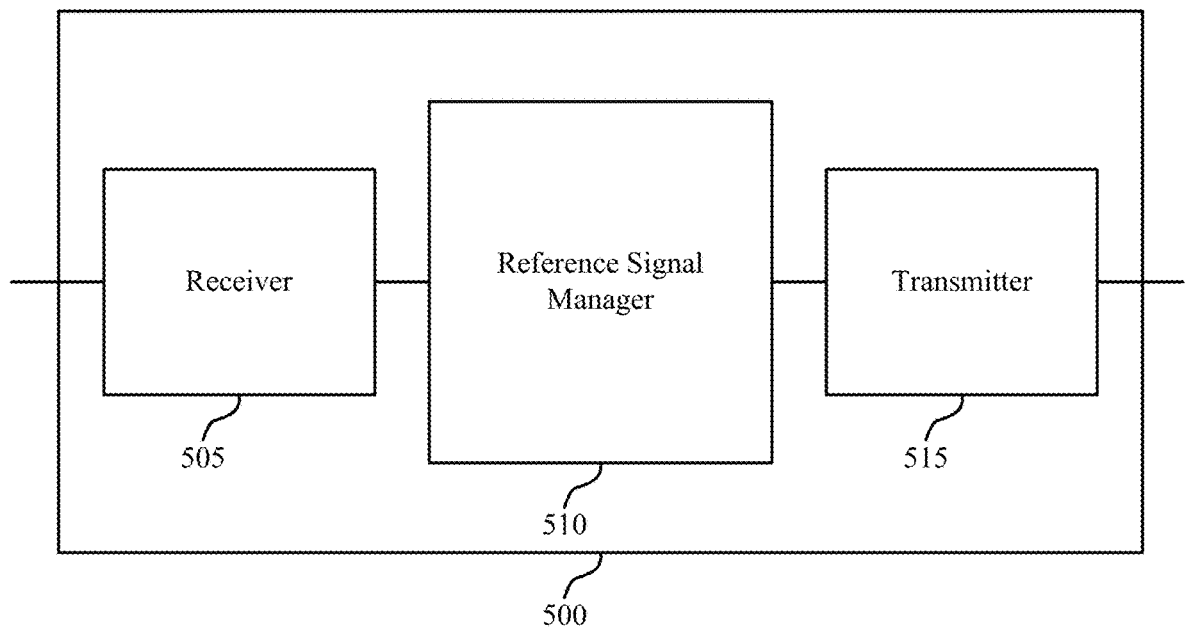
FIGS. 5 through 7 show diagrams of a wireless device that supports unified RS design in accordance with one or more aspects of the present disclosure.

FIG. 5 shows a diagram of a wireless device 500 that supports unified RS design for eCCs in accordance with various aspects of the present disclosure. Wireless device 500 may be an example of aspects of a UE 115 or base station 105 described with reference to FIGS. 1 and 2. Wireless device 500 may include receiver 505, RS manager 510 and transmitter 515. Wireless device 500 may also include a processor. Each of these components may be in communication with each other.

The receiver 505 may receive information such as packets, user data, or control information associated with various information channels (e.g., control channels, data channels, and information related to unified RS design for eCCs, etc.). Information may be passed on to other components of the device. The receiver 505 may be an example of aspects of the transceiver 825 described with reference to FIG. 8.

The RS manager 510 may multiplex RS transmissions for different antenna ports over a set of REs using a CDM group spreading in a time dimension and a frequency dimension, and transmit the RS transmissions over the set of REs based on the multiplexing.

The RS manager 510 may also receive RS transmissions for different antenna ports, where the RS transmissions are multiplexed over a set of REs using a CDM group that is spread in a time dimension and a frequency dimension, and perform RS processing based on at least a portion of the set of REs. The RS manager 510 may also be an example of aspects of the RS manager 805 described with reference to FIG. 8.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or it may include a plurality of antennas.

Figure 6:
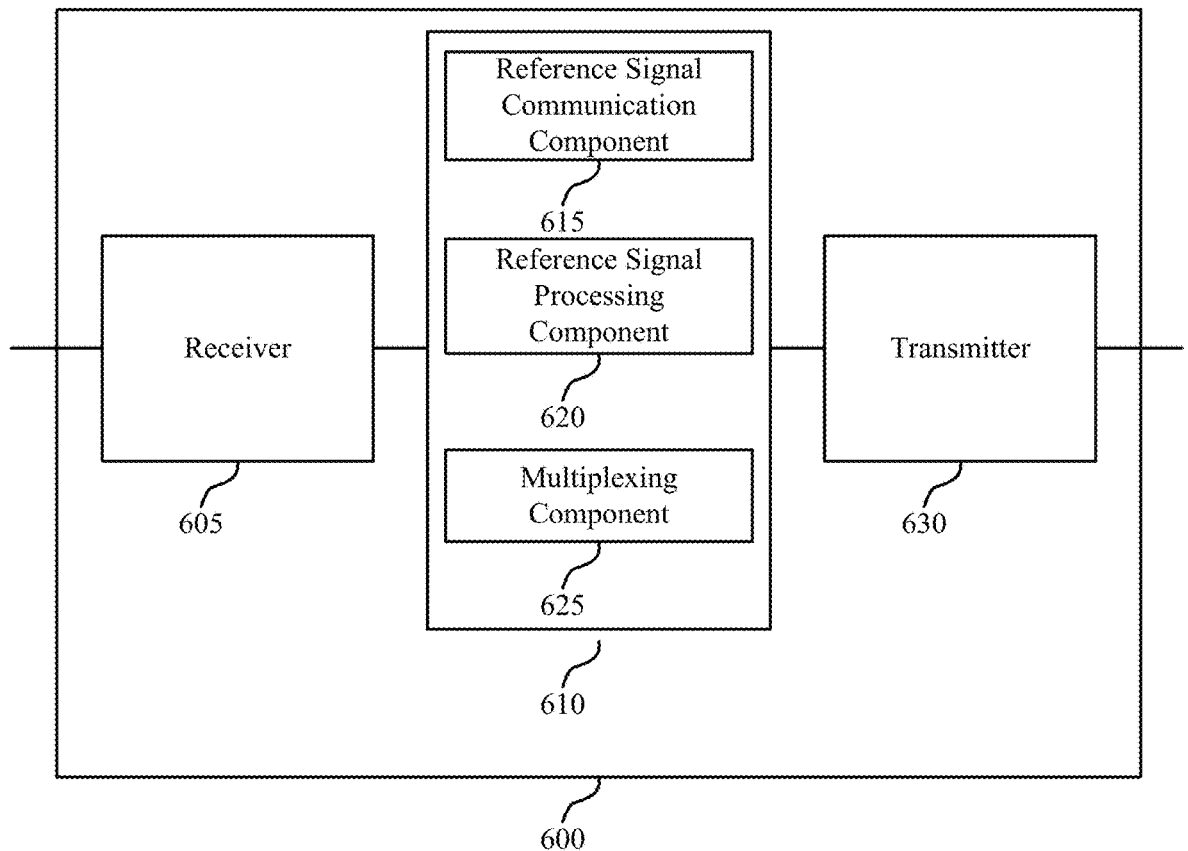

FIG. 6 shows a diagram of a wireless device 600 that supports unified RS design for eCCs in accordance with various aspects of the present disclosure. Wireless device 600 may be an example of aspects of a wireless device 500 or a UE 115 or base station 105 described with reference to FIGS. 1, 2 and 5. Wireless device 600 may include receiver 605, RS manager 610 and transmitter 630. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The RS manager 610 may be an example of aspects of RS manager 510 described with reference to FIG. 5. The RS manager 610 may include RS communication component 615, RS processing component 620 and multiplexing component 625. The RS manager 610 may be an example of aspects of the RS manager 805 described with reference to FIG. 8.

The RS communication component 615 may transmit the RS transmissions over the set of REs based on the multiplexing, and receive RS transmissions for different antenna ports, where the RS transmissions are multiplexed over a set of REs using a CDM group that is spread in a time dimension and a frequency dimension.

In some cases, the frequency dimension is based on DFT spreading. In some cases, the spreading sequence in the time dimension and the spreading sequence in the frequency dimension may have a one-to-one correspondence. In some cases, the set of REs includes a set of OFDM symbols and each of the RS transmissions is multiplexed over each of the OFDM symbols.

The RS processing component 620 may perform RS processing based on at least a portion of the set of REs. The multiplexing component 625 may multiplex RS transmissions for different antenna ports over a set of REs using a CDM group spreading in a time dimension and a frequency dimension.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or it may utilize a plurality of antennas.

Figure 7:
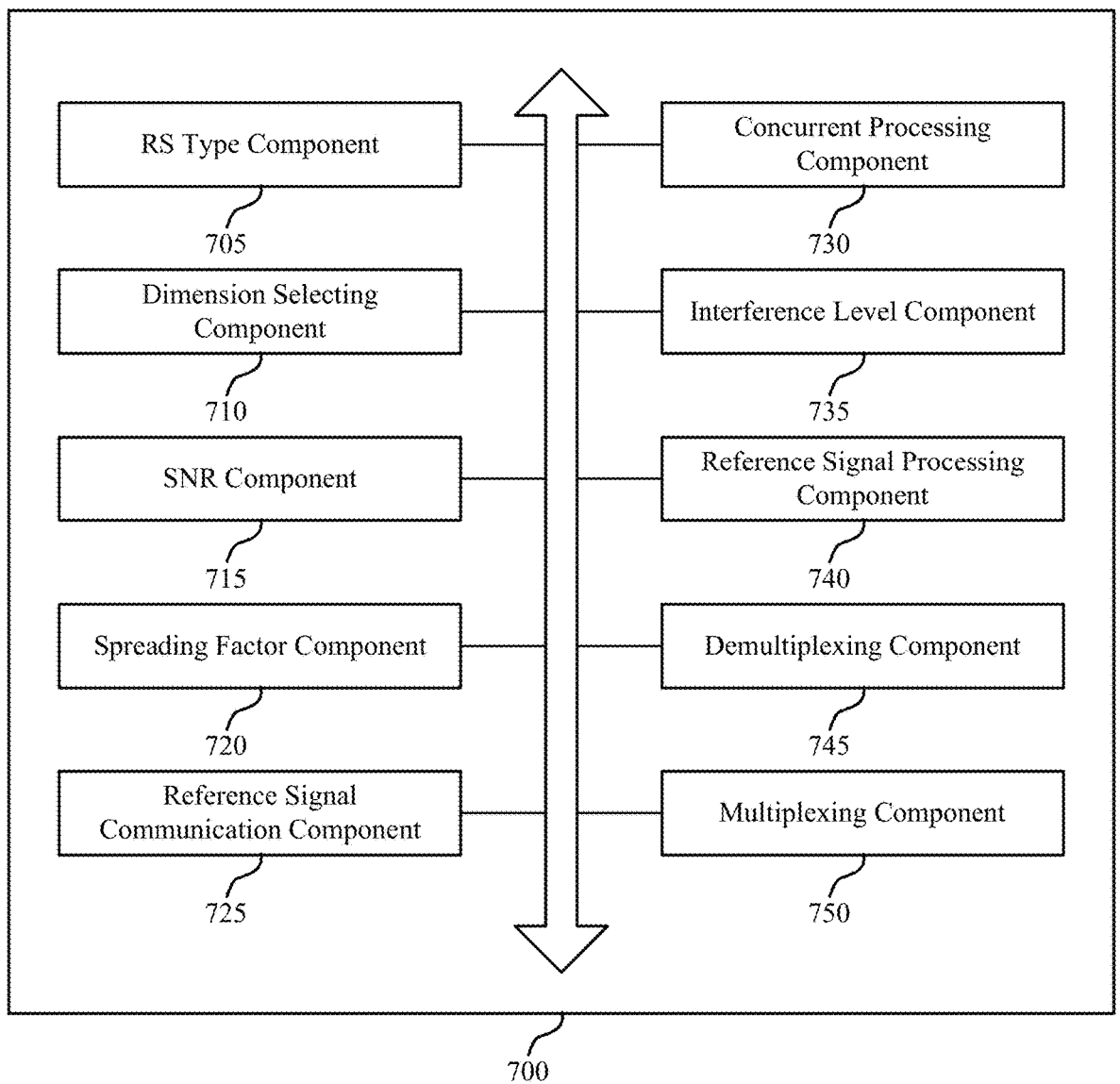

FIG. 7 shows a diagram of a RS manager 700 which may be an example of the corresponding component of wireless device 500 or wireless device 600. That is, RS manager 700 may be an example of aspects of RS manager 510 or RS manager 610 described with reference to FIGS. 5 and 6. The RS manager 700 may also be an example of aspects of the RS manager 805 described with reference to FIG. 8.

The RS manager 700 may include RS type component 705, dimension selecting component 710, SNR component 715, spreading factor component 720, transceiver 725, concurrent processing component 730, interference level component 735, RS processing component 740, demultiplexing component 745 and multiplexing component 750. Each of these modules may communicate, directly or indirectly, with one another (e.g., via one or more buses).

The RS type component 705 may determine a type of at least one of the RS transmissions. The dimension selecting component 710 may select at least one of the time dimension or the frequency dimension over which to demultiplex the RS transmissions based on a determined interference level, a determined type, or a specified SNR.

The SNR component 715 may determine an operating SNR level of a data channel to be decoded based on a RS transmission. The spreading factor component 720 may receive a spreading factor associated with the CDM group, where demultiplexing the RS transmissions is based on the received spreading factor, or transmit a spreading factor associated with the CDM group based on the multiplexing. In some cases, a spreading factor of the time dimension and a spreading factor of the frequency dimension are equal. In some cases, a spreading factor of the time dimension and a spreading factor of the frequency dimension are equal.

The transceiver 725 may transmit the RS transmissions over the set of REs based on the multiplexing, and receive RS transmissions for different antenna ports, where the RS transmissions are multiplexed over a set of REs using a CDM group that is spread in a time dimension and a frequency dimension.

The concurrent processing component 730 may process at least some of a set of OFDM symbols associated with at least one of the RS transmissions before a last OFDM symbol from the set is received. The interference level component 735 may determine an interference level associated with at least one of the OFDM symbols containing the RS transmissions.

The RS processing component 740 may perform RS processing based on at least a portion of the set of REs. The demultiplexing component 745 may demultiplex the RS transmissions based on the CDM group. The multiplexing component 750 may multiplex RS transmissions for different antenna ports over a set of REs using a CDM group spreading in a time dimension and a frequency dimension.

Figure 8:
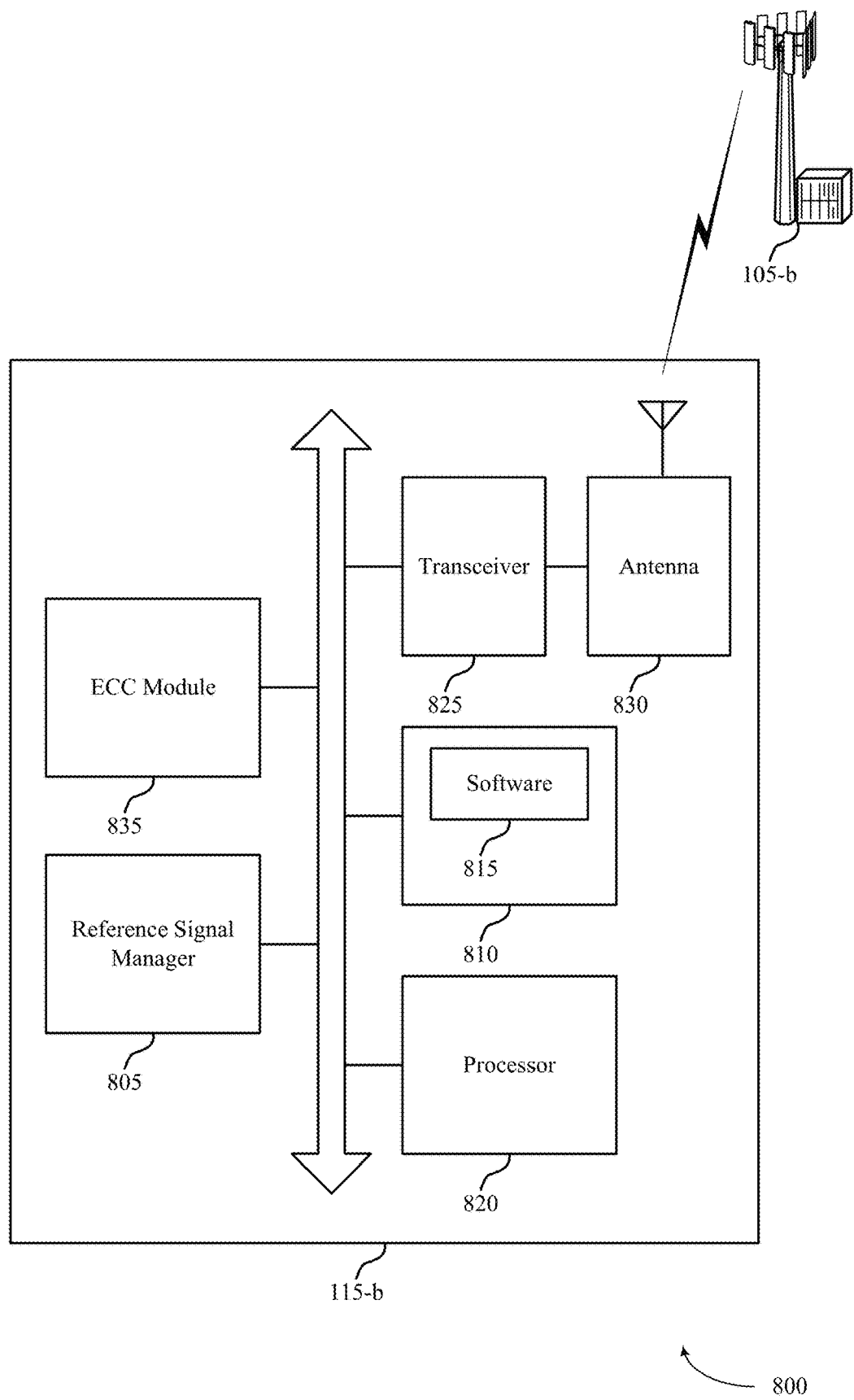
FIG. 8 illustrates a diagram of a system including a user equipment that supports unified RS design in accordance with one or more aspects of the present disclosure.

FIG. 8 shows a diagram of a system 800 including a device that supports unified RS design for eCCs in accordance with various aspects of the present disclosure. For example, system 800 may include UE 115-b, which may be an example of a wireless device 500, a wireless device 600, or a UE 115 as described with reference to FIGS. 1, 2 and 5 through 7.

UE 115-b may also include RS manager 805, memory 810, processor 820, transceiver 825, antenna 830 and eCC module 835. Each of these modules may communicate, directly or indirectly, with one another (e.g., via one or more buses).

The RS manager 805 may be an example of a RS manager 510, 610, or 700 as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., unified RS design for eCC, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

eCC module 835 may enable operations using eCCs such as communication using shared or unlicensed spectrum, using reduced TTIs (e.g., slots) or subframe durations, or using a large number of component carriers.

Figure 9:
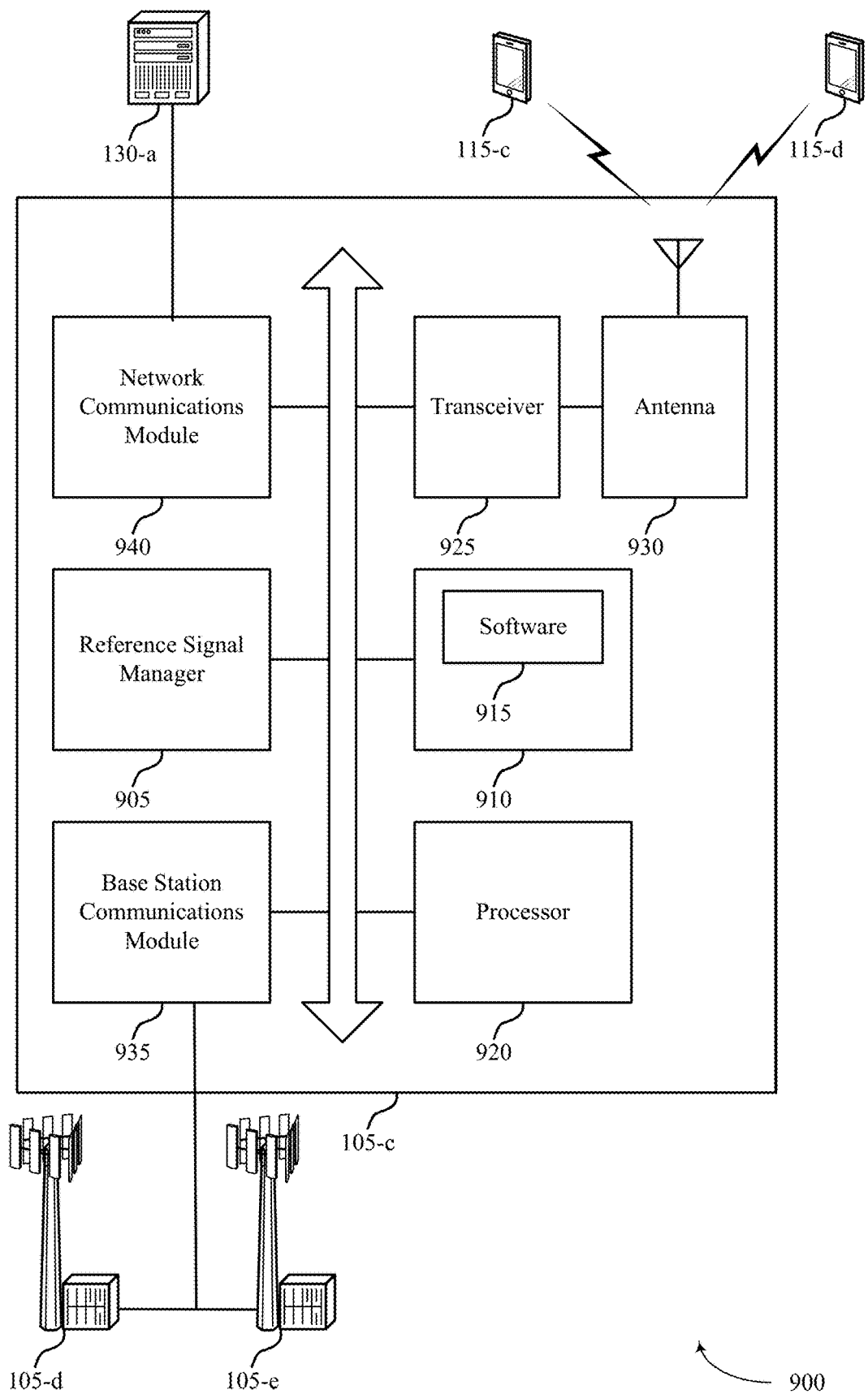
FIG. 9 illustrates a diagram of a system including a base station that supports unified RS design in accordance with one or more aspects of the present disclosure.

FIG. 9 shows a diagram of a wireless system 900 including a device configured that supports unified RS design for eCCs in accordance with various aspects of the present disclosure. For example, wireless system 900 may include base station 105-c, which may be an example of a wireless device 500, a wireless device 600, or a base station 105 as described with reference to FIGS. 1, 2, and 5 through 7. Base station 105-c may also include components for bi-directional voice and data communications including components for transmitting communications and components for receiving communications. For example, base station 105-c may communicate bi-directionally with one or more UEs 115.

Base station 105-c may also include RS manager 905, memory 910, processor 920, transceiver 925, antenna 930, base station communications module 935 and network communications module 940. Each of these modules may communicate, directly or indirectly, with one another (e.g., via one or more buses). The RS manager 905 may be an example of a RS manager 510, 610, or 700 as described with reference to FIGS. 5 through 7.

The memory 910 may include RAM and ROM. The memory 910 may store computer-readable, computer-executable software including instructions that, when executed, cause the processor to perform various functions described herein (e.g., unified RS design for eCCs, etc.). In some cases, the software 915 may not be directly executable by the processor but may cause a computer (e.g., when compiled and executed) to perform functions described herein. The processor 920 may include an intelligent hardware device, (e.g., a CPU, a microcontroller, an ASIC, etc.).

The transceiver 925 may communicate bi-directionally, via one or more antennas, wired, or wireless links, with one or more networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas. In some cases, the wireless system 900 including the device may include a single antenna 930. However, in some cases the device may have more than one antenna 830, which may be capable of concurrently transmitting or receiving multiple wireless transmissions.

The base station communications module 935 may manage communications with other base station 105, and may include a controller or scheduler for controlling communications with UEs 115 in cooperation with other base stations 105. For example, the base station communications module 935 may coordinate scheduling for transmissions to UEs 115 for various interference mitigation techniques such as beamforming or joint transmission. In some examples, base station communications module 935 may provide an X2 interface within an LTE/LTE-A wireless communication network technology to provide communication between base stations 105.

The network communications module 940 may manage communications with the core network (e.g., via one or more wired backhaul links, via backhaul links 134). For example, the network communications module 940 may manage the transfer of data communications for client devices, such as one or more UEs 115.

Figure 10:
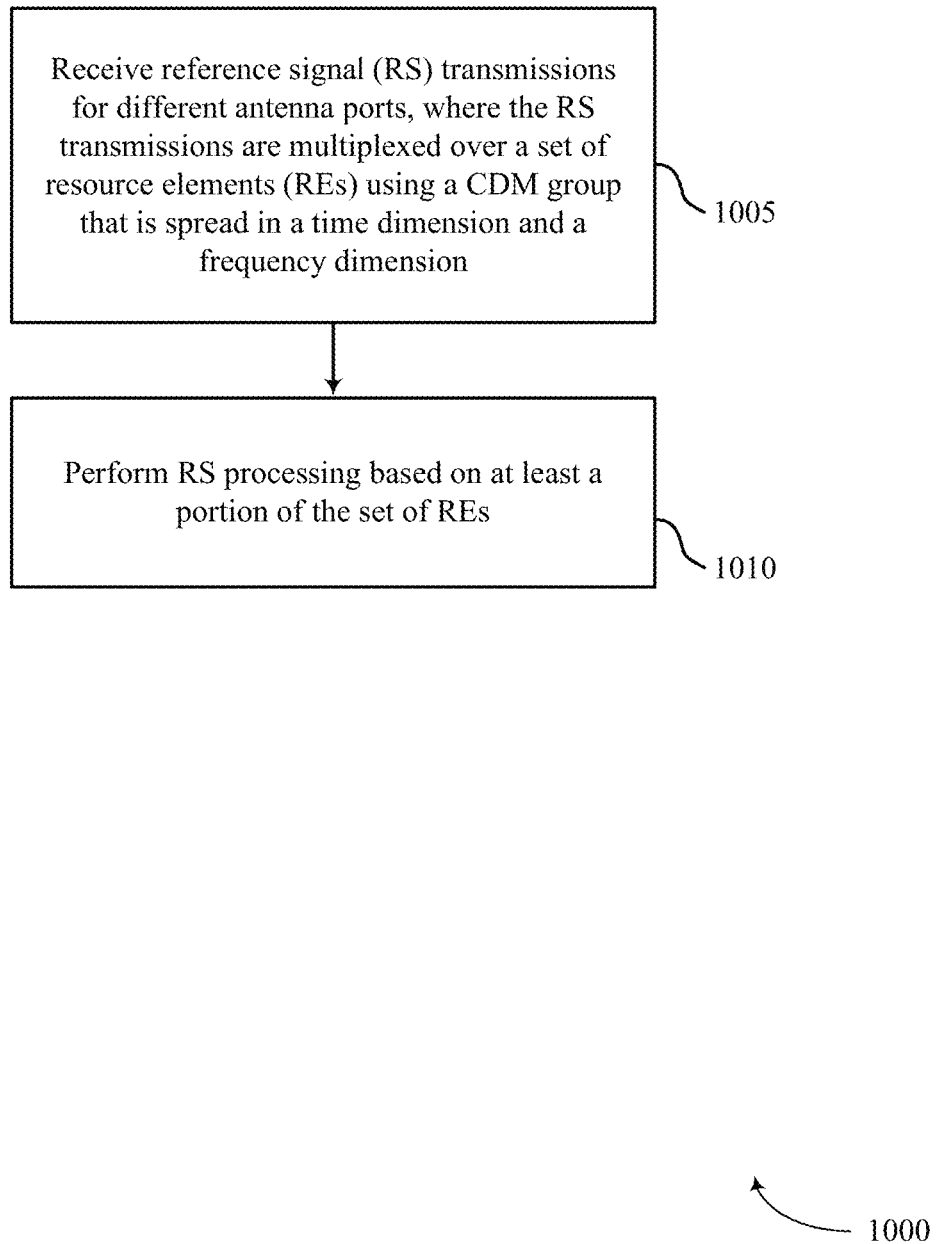
FIGS. 10 through 14 illustrate methods for unified RS design in accordance with one or more aspects of the present disclosure.

FIG. 10 shows a flowchart illustrating a method 1000 for unified RS design for eCCs in accordance with various aspects of the present disclosure. The operations of method 1000 may be implemented by a device such as a UE 115 or base station 105 or its components as described with reference to FIGS. 1 and 2. For example, the operations of method 1000 may be performed by the RS manager (e.g., RS manager 510, 610, 700, 805, 905) as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1005, the UE 115 or base station 105 may receive RS transmissions for different antenna ports, where the RS transmissions are multiplexed over a set of REs using a CDM group that is spread in a time dimension and a frequency dimension as described above with reference to FIGS. 2 through 4. In certain examples, the operations of block 1005 may be performed by the RS communication component 615 or 725 as described with reference to FIGS. 6 and 7.

At block 1010, the UE 115 or base station 105 may perform RS processing based on at least a portion of the set of REs as described above with reference to FIGS. 2 through 4. In certain examples, the operations of block 1010 may be performed by the RS processing component 620 or 740 as described with reference to FIGS. 6 and 7.

Figure 11:
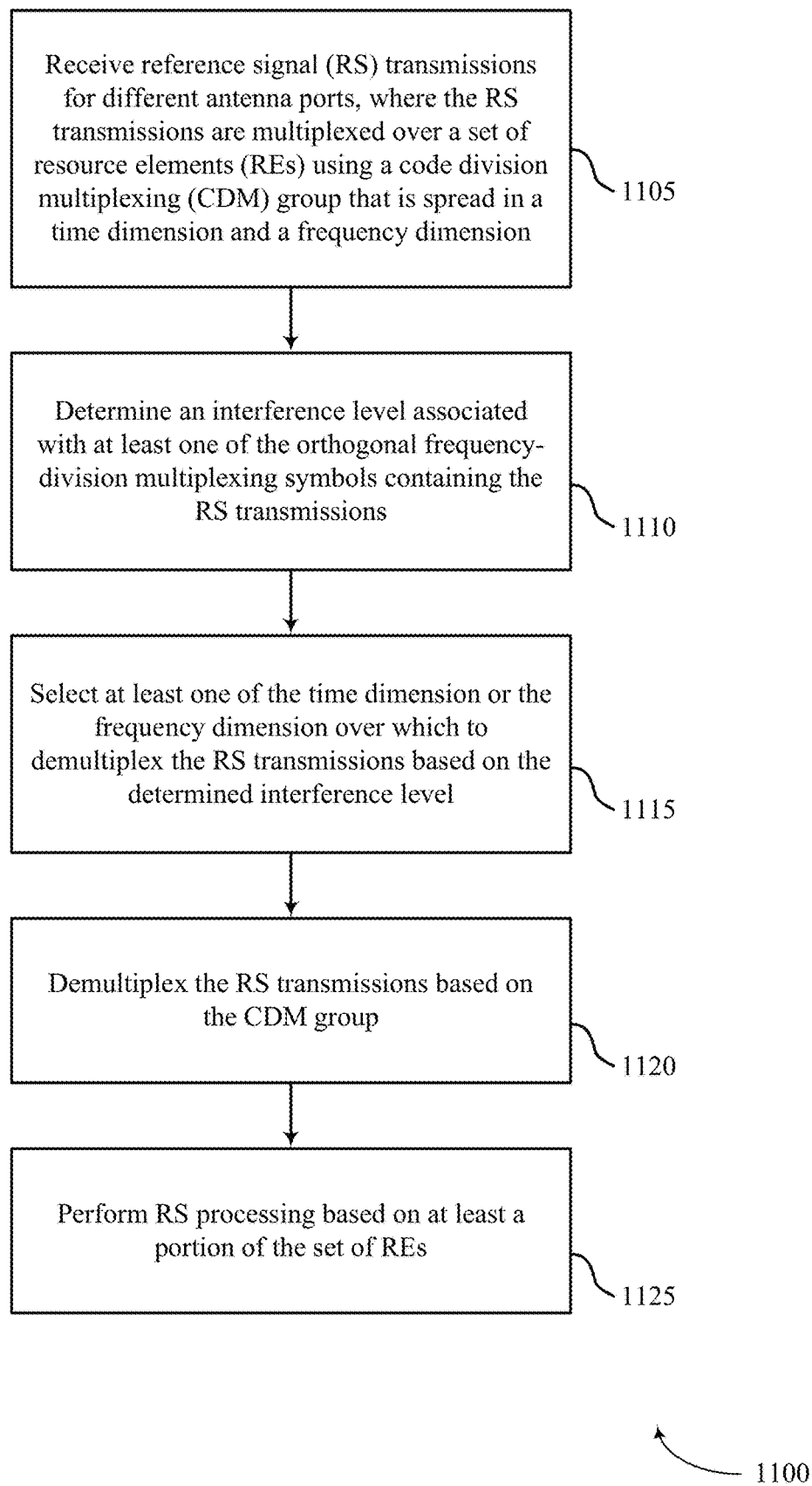

FIG. 11 shows a flowchart illustrating a method 1100 for unified RS design for eCCs in accordance with various aspects of the present disclosure. The operations of method 1100 may be implemented by a device such as a UE 115 or base station 105 or its components as described with reference to FIGS. 1 and 2. For example, the operations of method 1100 may be performed by the RS manager (e.g., RS manager 510, 610, 700, 805, 905) as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1105, the UE 115 or base station 105 may receive RS transmissions for different antenna ports, where the RS transmissions are multiplexed over a set of REs using a CDM group that is spread in a time dimension and a frequency dimension as described above with reference to FIGS. 2 through 4. In certain examples, the operations of block 1105 may be performed by the RS communication component 615 or 725 as described with reference to FIGS. 6 and 7.

At block 1110, the UE 115 or base station 105 may determine an interference level associated with at least one of the OFDM symbols containing the RS transmissions as described above with reference to FIGS. 2 through 4. In certain examples, the operations of block 1110 may be performed by the interference level component 735 as described with reference to FIG. 7.

At block 1115, the UE 115 or base station 105 may select at least one of the time dimension or the frequency dimension over which to demultiplex the RS transmissions based on the determined interference level as described above with reference to FIGS. 2 through 4. In certain examples, the operations of block 1115 may be performed by the dimension selecting component 710 as described with reference to FIG. 7.

At block 1120, the UE 115 or base station 105 may demultiplex the RS transmissions based on the CDM group as described above with reference to FIGS. 2 through 4. In certain examples, the operations of block 1120 may be performed by the demultiplexing component 745 as described with reference to FIG. 7.

At block 1125, the UE 115 or base station 105 may perform RS processing based on at least a portion of the set of REs as described above with reference to FIGS. 2 through 4. In some examples, the RS processing may include channel estimation and/or interference estimation (which may be used for demodulation), one or more measurements such as RSRP and RSRQ, one or more tracking loop operations such as TTL and FTL, or other processing operations. In certain examples, the operations of block 1125 may be performed by the RS processing component 620 or 740 as described with reference to FIGS. 6 and 7.

Figure 12:
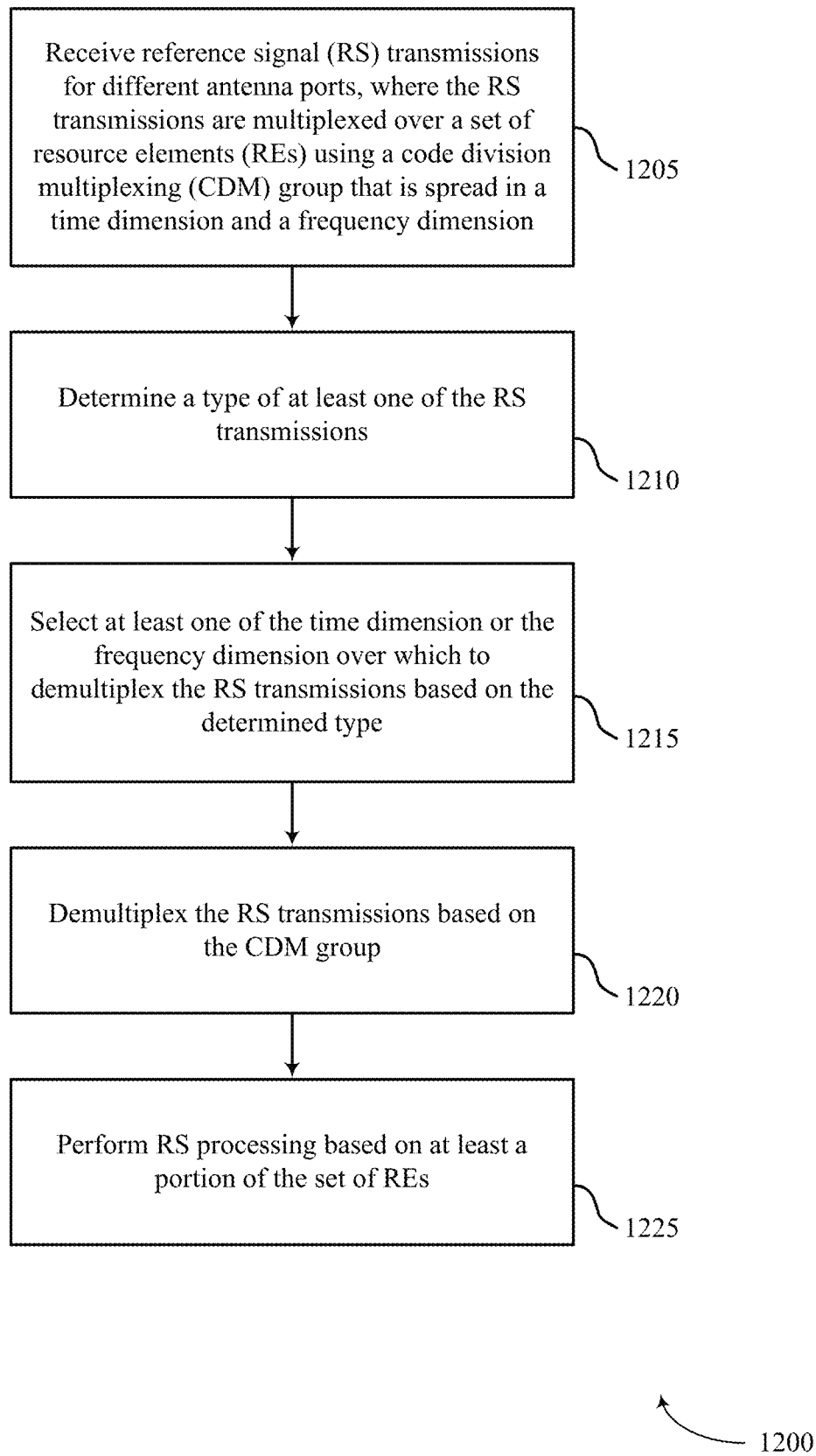

FIG. 12 shows a flowchart illustrating a method 1200 for unified RS design for eCCs in accordance with various aspects of the present disclosure. The operations of method 1200 may be implemented by a device such as a UE 115 or base station 105 or its components as described with reference to FIGS. 1 and 2. For example, the operations of method 1200 may be performed by the RS manager (e.g., RS manager 510, 610, 700, 805, 905) as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1205, the UE 115 or base station 105 may receive RS transmissions for different antenna ports, where the RS transmissions are multiplexed over a set of REs using a CDM group that is spread in a time dimension and a frequency dimension as described above with reference to FIGS. 2 through 4. In certain examples, the operations of block 1205 may be performed by the RS communication component 615 or 725 as described with reference to FIGS. 6 and 7.

At block 1210, the UE 115 or base station 105 may determine a type of at least one of the RS transmissions as described above with reference to FIGS. 2 through 4. In certain examples, the operations of block 1210 may be performed by the RS type component 705 as described with reference to FIGS. 6 and 7.

At block 1215, the UE 115 or base station 105 may select at least one of the time dimension or the frequency dimension over which to demultiplex the RS transmissions based on the determined type as described above with reference to FIGS. 2 through 4. In certain examples, the operations of block 1215 may be performed by the dimension selecting component 710 as described with reference to FIG. 7.

At block 1220, the UE 115 or base station 105 may demultiplex the RS transmissions based on the CDM group as described above with reference to FIGS. 2 through 4. In certain examples, the operations of block 1220 may be performed by the demultiplexing component 745 as described with reference to FIG. 7.

At block 1225, the UE 115 or base station 105 may perform RS processing based on at least a portion of the set of REs as described above with reference to FIGS. 2 through 4. In some examples, the RS processing may include channel estimation and/or interference estimation (which may be used for demodulation), one or more measurements such as RSRP and RSRQ, one or more tracking loop operations such as TTL and FTL, etc. The UE 115 or base station 105 may perform RS processing based on at least a portion of the set of REs as described above with reference to FIGS. 2 through 4. In certain examples, the operations of block 1225 may be performed by the RS processing component 620 or 740 as described with reference to FIGS. 6 and 7.

Figure 13:
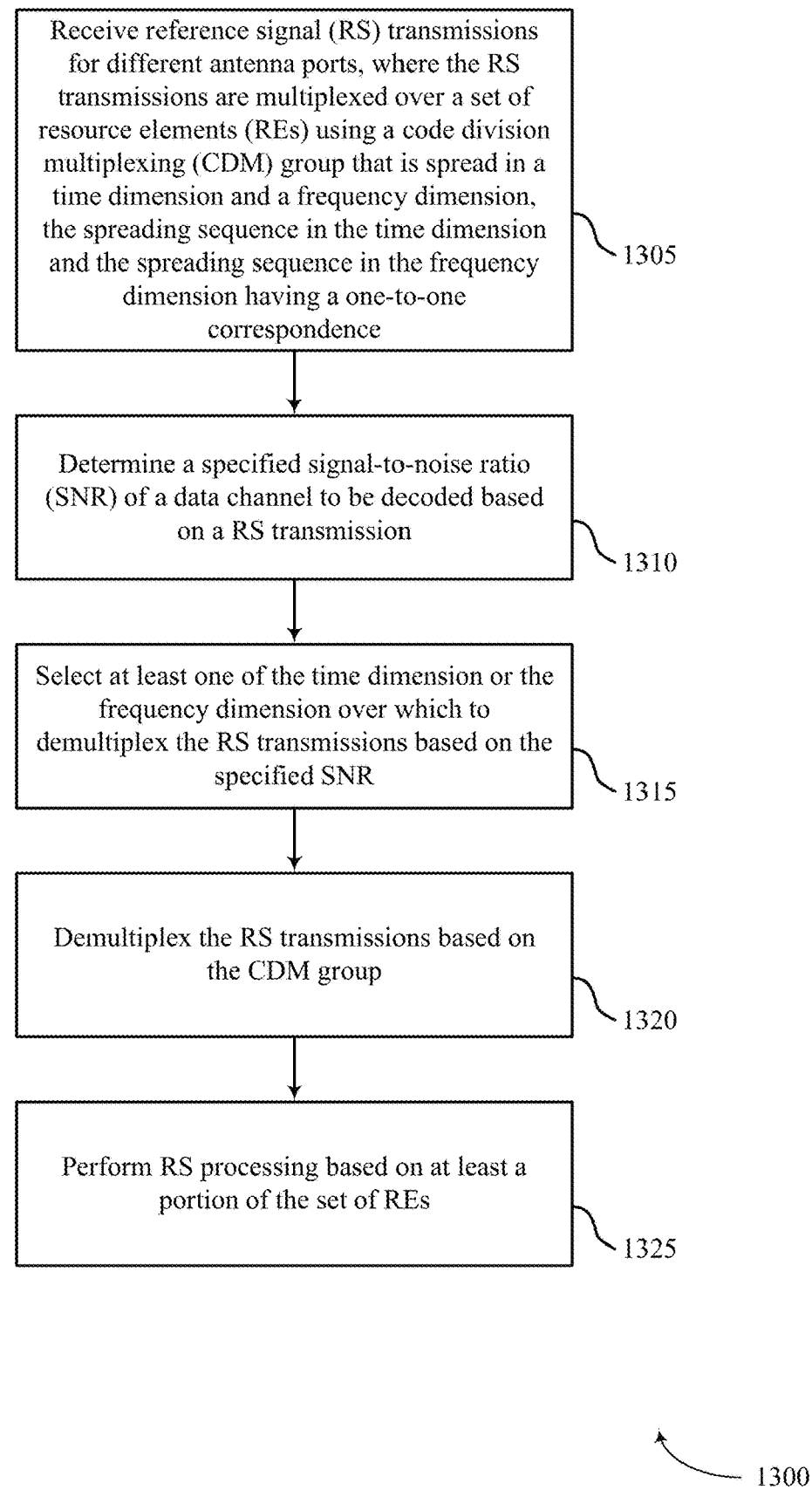

FIG. 13 shows a flowchart illustrating a method 1300 for unified RS design for eCCs in accordance with various aspects of the present disclosure. The operations of method 1300 may be implemented by a device such as a UE 115 or base station 105 or its components as described with reference to FIGS. 1 and 2. For example, the operations of method 1300 may be performed by the RS manager (e.g., RS manager 510, 610, 700, 805, 905) as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1305, the UE 115 or base station 105 may receive RS transmissions for different antenna ports, where the RS transmissions are multiplexed over a set of REs using a CDM group that is spread in a time dimension and a frequency dimension, the spreading sequence in the time dimension and the spreading sequence in the frequency dimension having a one-to-one correspondence, as described above with reference to FIGS. 2 through 4. In certain examples, the operations of block 1305 may be performed by the RS communication component 615 or 725 as described with reference to FIGS. 6 and 7.

At block 1310, the UE 115 or base station 105 may determine an operating SNR level of a data channel to be decoded based on a RS transmission as described above with reference to FIGS. 2 through 4. In certain examples, the SNR may be determined based on the RS type. For example, PDCCH operates at a low SNR. In certain examples, the SNR may be determined by decoding PDCCH. For example, the physical downlink shared channel (PDSCH) operating SNR level is obtained by obtaining the modulation and coding format conveyed in PDCCH. In certain examples, the operations of block 1310 may be performed by the SNR component 715 as described with reference to FIG. 7.

At block 1315, the UE 115 or base station 105 may select at least one of the time dimension or the frequency dimension over which to demultiplex the RS transmissions based on the specified SNR as described above with reference to FIGS. 2 through 4. In certain examples, the operations of block 1315 may be performed by the dimension selecting component 710 as described with reference to FIG. 7.

At block 1320, the UE 115 or base station 105 may demultiplex the RS transmissions based on the CDM group as described above with reference to FIGS. 2 through 4. In certain examples, the operations of block 1320 may be performed by the demultiplexing component 745 as described with reference to FIG. 7.

At block 1325, the UE 115 or base station 105 may perform RS processing based on at least a portion of the set of REs as described above with reference to FIGS. 2 through 4. In certain examples, the operations of block 1325 may be performed by the RS processing component 620 or 740 as described with reference to FIGS. 6 and 7.

Figure 14:
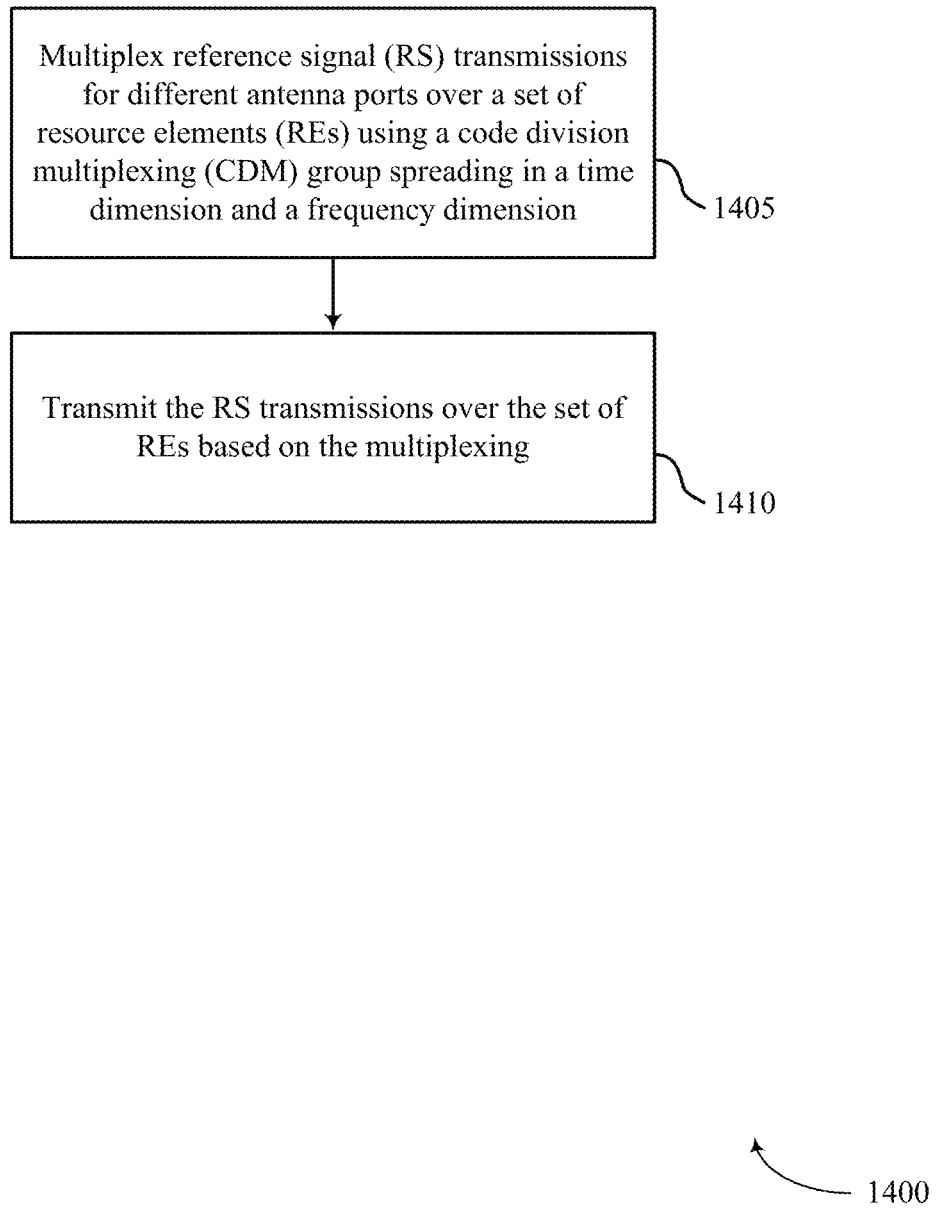

FIG. 14 shows a flowchart illustrating a method 1400 for unified RS design for eCCs in accordance with various aspects of the present disclosure. The operations of method 1400 may be implemented by a device such as a UE 115 or base station 105 or its components as described with reference to FIGS. 1 and 2. For example, the operations of method 1400 may be performed by the RS manager (e.g., RS manager 510, 610, 700, 805, 905) as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1405, the UE 115 or base station 105 may multiplex RS transmissions for different antenna ports over a set of REs using a CDM group spreading in a time dimension and a frequency dimension as described above with reference to FIGS. 2 through 4. In certain examples, the operations of block 1405 may be performed by the multiplexing component 625 or 750 as described with reference to FIGS. 6 and 7.

At block 1410, the UE 115 or base station 105 may transmit the RS transmissions over the set of REs based on the multiplexing as described above with reference to FIGS. 2 through 4. In certain examples, the operations of block 1410 may be performed by the RS communication component 615 or 725 as described with reference to FIGS. 6 and 7.

It should be noted that the methods [1000], [1100], [1200], [1300], and [1400] are just example implementations, and that the operations and the steps of the methods [1000], [1100], [1200], [1300], and [1400] may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for unified RS design for eCCs, among other examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3 GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an AP, a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home(FPG eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., RSs, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for unified RS design for eCCs. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
receiving reference signal (RS) transmissions for different antenna ports, wherein the RS transmissions are multiplexed over a set of resource elements (REs) using a code division multiplexing (CDM) group that is spread in a time dimension using a first spreading sequence and in a frequency dimension using a second spreading sequence that is different than the first spreading sequence and has a one-to-one correspondence with the first spreading sequence within a plurality of spreading sequence combinations, wherein the set of REs comprises a set of orthogonal frequency-division multiplexing (OFDM) symbols and each RS transmission is multiplexed over each OFDM symbol;
demultiplexing the RS transmissions using at least one of the first spreading sequence or the second spreading sequence based at least in part on the CDM group and the one-to-one correspondence between the first spreading sequence and the second spreading sequence; and
performing RS processing based on at least a portion of the set of REs and the demultiplexed RS transmissions.

2. The method of claim 1, further comprising:
determining an interference level associated with at least one OFDM symbol containing the RS transmissions; and
selecting at least one of the time dimension or the frequency dimension over which to demultiplex the RS transmissions based at least in part on the determined interference level.

3. The method of claim 1, further comprising:
determining a type of at least one of the RS transmissions; and
selecting at least one of the time dimension or the frequency dimension over which to demultiplex the RS transmissions based at least in part on the determined type.

4. The method of claim 1, further comprising:
determining an operating signal-to-noise ratio (SNR) level of a data channel to be decoded based on a RS transmission; and
selecting at least one of the time dimension or the frequency dimension over which to demultiplex the RS transmissions based at least in part on the operating SNR level.

5. The method of claim 1, wherein a spreading factor of the time dimension and a spreading factor of the frequency dimension are equal.

6. The method of claim 1, wherein the CDM group is spread in the frequency dimension based at least in part on discrete Fourier transformation (DFT) spreading.

7. The method of claim 1, further comprising:
processing at least some of the set of OFDM symbols associated with the RS transmissions before a last OFDM symbol from the set is received.

8. The method of claim 1, further comprising:
receiving a spreading factor associated with the CDM group, wherein the plurality of spreading sequence combinations correspond to the spreading factor.

9. A method of wireless communication comprising:
multiplexing reference signal (RS) transmissions for different antenna ports over a subset of resource elements (REs) using a code division multiplexing (CDM) group that is spread in a time dimension using a first spreading sequence and in a frequency dimension using a second spreading sequence that is different than the first spreading sequence and has a one-to-one correspondence with the first spreading sequence within a plurality of spreading sequence combinations, wherein the subset of REs are from a set of REs available within a subframe, wherein the subset of REs comprises a set of orthogonal frequency-division multiplexing (OFDM) symbols and each RS transmission is multiplexed over each OFDM symbol; and
transmitting the RS transmissions over the set of REs based at least in part on the multiplexing.

10. The method of claim 9, further comprising:
transmitting a spreading factor associated with the CDM group based at least in part on the multiplexing.

11. The method of claim 10, wherein the plurality of spreading sequence combinations correspond to the spreading factor.

12. The method of claim 9, wherein a spreading factor of the time dimension and a spreading factor of the frequency dimension are equal.

13. The method of claim 9, wherein the CDM group is spread in the frequency dimension based at least in part on discrete Fourier transformation (DFT) spreading.

14. An apparatus for wireless communication, comprising:
a processor;
memory in electronic communication with the processor; and
instructions stored in the memory and operable, when executed by the processor, to cause the apparatus to:
receive reference signal (RS) transmissions for different antenna ports, wherein the RS transmissions are multiplexed over a set of resource elements (REs) using a code division multiplexing (CDM) group that is spread in a time dimension using a first spreading sequence and in a frequency dimension using a second spreading sequence that is different than the first spreading sequence and has a one-to-one correspondence with the first spreading sequence within a plurality of spreading sequence combinations, wherein the set of REs comprises a set of orthogonal frequency-division multiplexing (OFDM) symbols and each RS transmission is multiplexed over each OFDM symbol;
demultiplex the RS transmissions using at least one of the first spreading sequence or the second spreading sequence based at least in part on the CDM group and the one-to-one correspondence between the first spreading sequence and the second spreading sequence; and
perform RS processing based on at least a portion of the set of REs and the demultiplexed RS transmissions.

15. The apparatus of claim 14, wherein the instructions are operable to cause the processor to cause the apparatus to:
determine an interference level associated with at least one OFDM symbol containing the RS transmissions; and
select at least one of the time dimension or the frequency dimension over which to demultiplex the RS transmissions based at least in part on the determined interference level.

16. The apparatus of claim 14, wherein the instructions are operable to cause the processor to cause the apparatus to:
determine a type of at least one of the RS transmissions; and
select at least one of the time dimension or the frequency dimension over which to demultiplex the RS transmissions based at least in part on the determined type.

17. The apparatus of claim 14, wherein the instructions are operable to cause the processor to cause the apparatus to:
determine an operating signal-to-noise ratio (SNR) level of a data channel to be decoded based on a RS transmission; and
select one or both of the time dimension and the frequency dimension over which to demultiplex the RS transmissions based at least in part on the operating SNR level.

18. The apparatus of claim 14, wherein a spreading factor of the time dimension and a spreading factor of the frequency dimension are equal.

19. The apparatus of claim 14, wherein the CDM group is spread in the frequency dimension based at least in part on discrete Fourier transformation (DFT) spreading.

20. The apparatus of claim 14, wherein the instructions are operable to cause the processor to cause the apparatus to:
process at least some of the set of OFDM symbols associated with at least one of the RS transmissions before a last OFDM symbol from the set is received.

21. The apparatus of claim 14, wherein the instructions are operable to cause the processor to cause the apparatus to:
receive a spreading factor associated with the CDM group, wherein the plurality of spreading sequence combinations correspond to the spreading factor.

22. An apparatus for wireless communication, comprising:
a processor;
memory in electronic communication with the processor; and
instructions stored in the memory and operable, when executed by the processor, to cause the apparatus to:
multiplex reference signal (RS) transmissions for different antenna ports over a subset of resource elements (REs) using a code division multiplexing (CDM) group that is spread in a time dimension using a first spreading sequence and in a frequency dimension using a second spreading sequence that is different than the first spreading sequence and has a one-to-one correspondence with the first spreading sequence within a plurality of spreading sequence combinations, wherein the subset of REs are from a set of REs available within a subframe; and transmit the RS transmissions over the set of REs based at least in part on the multiplexing, wherein the subset of REs comprises a set of orthogonal frequency-division multiplexing (OFDM) symbols and each RS transmission is multiplexed over each OFDM symbol.

23. The apparatus of claim 22, wherein the instructions are operable to cause the processor to:
transmit a spreading factor associated with the CDM group based at least in part on the multiplexing.

24. The apparatus of claim 23, wherein the plurality of spreading sequence combinations correspond to the spreading factor.

25. The apparatus of claim 22, wherein a spreading factor of the time dimension and a spreading factor of the frequency dimension are equal.

26. The apparatus of claim 22, wherein the CDM group is spread in the frequency dimension based at least in part on discrete Fourier transformation (DFT) spreading.

* * * * *